(12) United States Patent
Evenson

(10) Patent No.: US 10,127,270 B1
(45) Date of Patent: Nov. 13, 2018

(54) TRANSACTION PROCESSING USING A KEY-VALUE STORE

(71) Applicant: AMAZON TECHNOLOGIES, INC., Reno, NV (US)

(72) Inventor: Andrew Ross Evenson, Seattle, WA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 269 days.

(21) Appl. No.: 14/311,679

(22) Filed: Jun. 23, 2014

(51) Int. Cl.
*G06F 17/30* (2006.01)

(52) U.S. Cl.
CPC .. *G06F 17/30377* (2013.01); *G06F 17/30227* (2013.01)

(58) Field of Classification Search
CPC ......... G06F 17/30345; G06F 17/30377; G06F 17/30227
USPC ........................................ 707/690, 703, 826
See application file for complete search history.

(56) References Cited

U.S. PATENT DOCUMENTS

| 2014/0156618 | A1* | 6/2014 | Castellano | G06F 17/30587 707/703 |
| 2014/0330767 | A1* | 11/2014 | Fowler | G06F 9/466 707/607 |
| 2015/0277794 | A1* | 10/2015 | Tudor | G06F 3/0619 711/103 |
| 2016/0042023 | A1* | 2/2016 | Leach | G06F 9/466 707/703 |

OTHER PUBLICATIONS

Yanacek, "From CD to ACID: Adding Atomicity and Isolation to DynamoDB", GitHub, [online] [retrieved on May 8, 2014] Retrieved from the Internet: <https://github.com/awslabs/dynamodb-transactions/blob/master/DESIGN.md>.

* cited by examiner

*Primary Examiner* — Hares Jami
(74) *Attorney, Agent, or Firm* — Lindauer Law, PLLC

(57) ABSTRACT

Techniques are described for using a distributed key-value store to store data and track transactions performed against the data. The key-value store may include data objects as files in a file system, such that the file name of a file is a key and the contents of the file is a value corresponding to the key. The key-value store may also include transaction objects that track the status of transactions to modify the data objects, the status being one of open, committed, or cancelled. Previous and updated data may be included in the value of a data object to indicate that the data object is in the process of being modified. The value may also include a transaction identifier identifying the transaction that is modifying the data object.

20 Claims, 12 Drawing Sheets

TRANSACTION PROCESSING USING A KEY-VALUE STORE

BACKGROUND

An organization engaged in electronic commerce or other types of services may generate and consume a large quantity of data regarding operations of the organization. Such data may be stored, accessed, or modified through the execution of any number of transactions requested by data consumers who are internal to or external to the organization. Because the transactions may be associated with sales, customer experience, inventory management, or other operations of the organization, delays or failures in the execution of transactions may adversely affect the organization.

Figure 1:
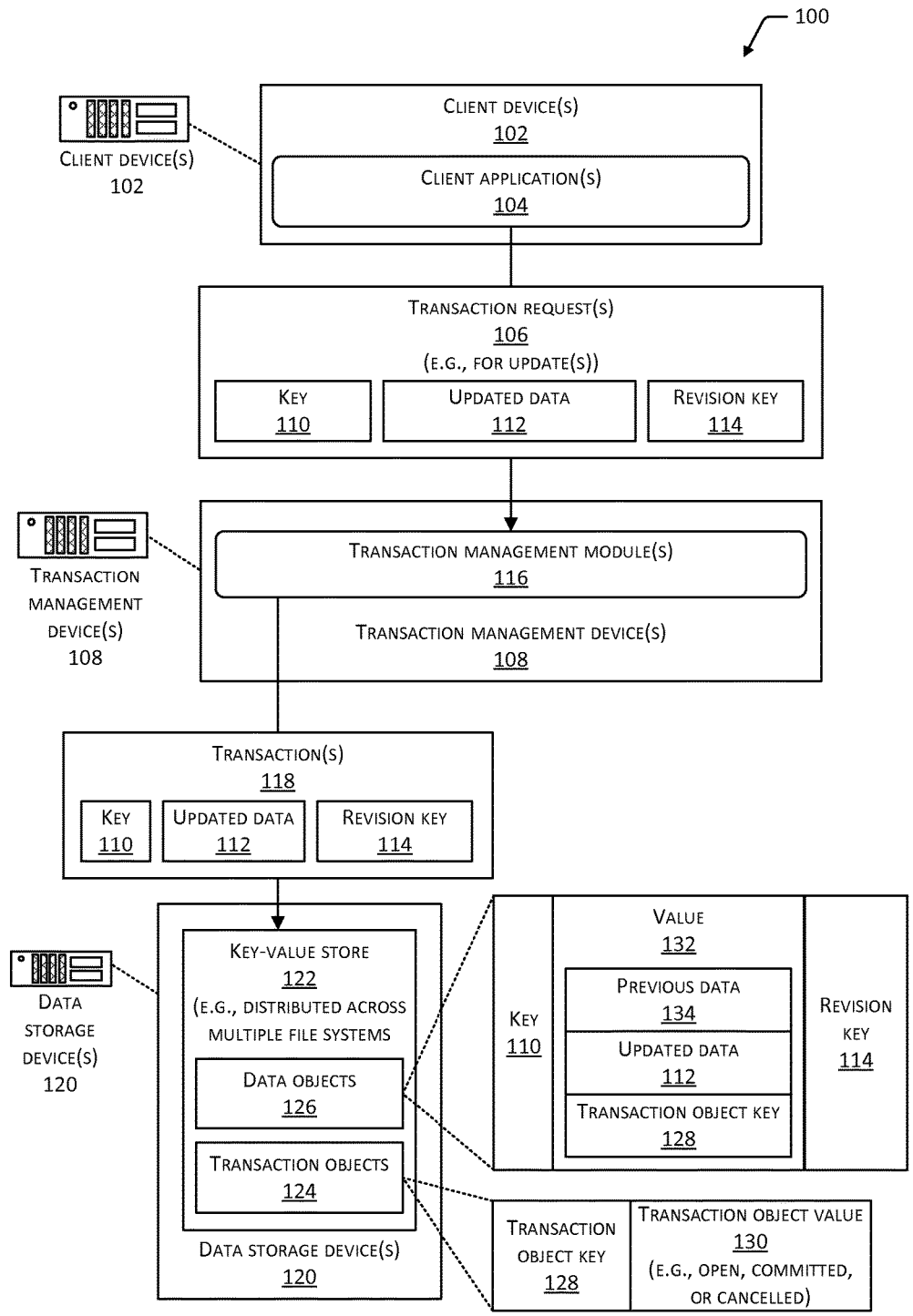
FIG. 1 depicts an environment for employing a key-value store for data storage and transaction management, and for performing an update transaction to modify data stored in the key-value store.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for employing a key-value store to store data and to track the status of transactions that may execute to modify the stored data. Data may be stored in data objects within a key-value store. The status of transactions may be tracked in transaction objects also included in the key-value store. A key-value store may include any type of data storage in which any amount of data (e.g., any number of bytes of data) is stored and associated with a key of any size or data type. The key-value store may include, but is not limited to, an associative array, a map, a table, a hash map, a hash table, and so forth. In some implementations, the key-value store may comprise at least a portion of the file system on one or more computing devices. In such cases, the file name of a file may be employed as the key to access the contents (e.g., the value) of the file stored in the file system.

Implementations provide for two types of objects included in the key-value store: data objects and transaction objects. In some implementations, a data object may be a file, the key to the data object may be the file name of the file, and the value of the data object may be the data stored in the file. The data objects may include values that store any type or amount of data in any format. A transaction object may be created to track the status of a transaction to modify the value of one or more data objects in the key-value store. In some cases, transaction objects may be included as additional files in the key-value store. The key to a transaction object may be a file name that is an identifier (ID) of the transaction. In some cases, the key to the transaction object may be a universally unique identifier (UUID). The value of a transaction object may indicate the status of the corresponding transaction. In some implementations a transaction may, at any particular time, have a status of committed, open, or cancelled.

A transaction may modify any number of data objects stored in the key-value store, and implementations provide for atomicity in transaction management. For example, if a transaction is in a committed status, then all of the data updates associated with the transaction have been completed. If a transaction is in an open status, then not all of the data updates have completed. If a transaction is in a cancelled status, then none of the data updates of the transaction have changed the state of the key-value store from the perspective of an external process that is reading from or writing to the key-value store. Along with atomicity, implementations also provide for data storage transaction processing that complies with the other "ACID" criteria of consistency, isolation, and durability. The transaction management may also be consistent, such that if one operation of a transaction fails then the other operations of the transaction are rolled back or not performed, and the state of the key-value store is left unchanged. For example, if a transaction is to update the value stored in multiple data objects and one update fails, then the transaction status is set to cancelled so that other updates performed by the transaction do not change the state of the key-value store from the perspective of an external process. Implementations may provide for isolation in transaction management, given that there may be no communication, coordination, or other interaction between the transaction management devices handling transactions. Implementations may provide for durability in transaction management, given that a committed transaction may permanently change the values stored in one or more data objects even if one or more computing devices fail or experience errors.

FIG. 1 depicts an environment 100 in which implementations may operate. The environment 100 may include any number of client devices 102. The client device(s) 102 may be any type of computing device, including but not limited to a server computer, a network computer, a distributed computing (e.g., cloud computing) device, a mainframe computer, a personal computer, a smartphone, a tablet computer, a wearable computer, an implanted computer, a mobile gaming device, an electronic book reader, an automotive computer, a desktop computer, a laptop computer, a game console, a home entertainment device, and so forth. Although examples herein may describe the client device(s) 102 as a physically separate device, implementations are not so limited. In some cases, the client device(s) 102 may include one or more of a virtual computing environment, a hypervisor, a device emulation, or a virtual machine executing on one or more physical computing devices.

The client device(s) 102 may execute any number of client applications 104 that generate one or more transaction requests 106. The transaction request(s) 106 may include requests to execute transactions that modify the value of one or more data objects in a key-value store. The transaction request(s) 106 may also include requests to execute transactions that retrieve a current value of one or more data objects in the key-value store. The client application(s) 104 may include any type of software that generates data to be stored in the key-value store. The client application(s) 104 may also include any type of software that consumes, presents, or processes data retrieved from the key-value store.

The client application(s) 104 may communicate the transaction request(s) 106 to one or more transaction management devices 108. The transaction management device(s) 108 may include any type of computing device, including but not limited to any of the types of computing devices listed with reference to the client device(s) 102. In some cases, two or more of the transaction management devices 108 may comprise a cluster, cloud, farm, or other grouping of multiple devices that coordinate operations to provide load balancing, failover support, parallel processing capabilities, shared storage resources, or other aspects. Although examples herein may describe the transaction management device(s) 108 as physically separate devices, implementations are not so limited. In some cases, the transaction management device(s) 108 may include one or more of a virtual computing environment, a hypervisor, a device emulation, or a virtual machine executing on one or more physical computing devices. Moreover, although FIG. 1 depicts the client device(s) 102 as separate from the transaction management device(s) 108, in some implementations at least some of the functions of the client device(s) 102 and the transaction management device(s) 108 may be performed on a same set of one or more computing devices. The transaction management device(s) 108 are described further with reference to FIG. 3.

In the example of FIG. 1, the transaction request(s) 106 are requesting transaction(s) for updating the value(s) of data object(s) in the key-value store. Accordingly, each of the transaction request(s) 106 may specify a key 110 that identifies the data object to be updated. The transaction request 106 may also specify updated data 112 to be stored in the data object. In some implementations, the transaction request(s) 106 may also include a revision key 114 that indicates a revision or version of the previous data stored in the data object prior to the execution of the transaction to update the data. The revision key 114 may be a revision number, a timestamp (e.g., indicating one or both of a date or time when the previous data was stored), or some other revision indicator. In some cases, the revision key 114 may be a hash of the data stored in the data object, a timestamped hash, or a sequence number. In some implementations, the revision key 114 may be employed to provide for consistency in transactions to update the key-value store. For example, a transaction may not execute to update a data object unless the revision key 114 currently included in the data object corresponds to the revision key 114 specified in the transaction request 106. In some implementations, the transaction request(s) 106 may include the previous data, instead of or in addition to the revision key 114.

The transaction request(s) 106 may be received by one or more transaction management module(s) 116 executing on the transaction management device(s) 108. For each transaction request 106, the transaction management module(s) 116 may execute a transaction 118 against one or more data objects in the key-value store. The transaction(s) 118 may specify the key 110 and the updated data 112. In some cases, the transaction(s) 118 may also specify the revision key 114. To execute the transaction 118, the transaction management module(s) 116 may communicate with one or more data storage devices 120 that implement the key-value store 122.

The data storage device(s) 120 may include any type of computing device, including but not limited to any of the types of computing devices listed with reference to the client device(s) 102 or the transaction management device(s) 108. In some cases, two or more of the data storage devices 120 may comprise a cluster, cloud, farm, or other grouping of multiple devices that coordinate operations to provide load balancing, failover support, parallel processing capabilities, shared storage resources, or other aspects. Although examples herein may describe the data storage device(s) 120 as physically separate devices, implementations are not so limited. In some cases, the data storage device(s) 120 may include one or more of a virtual computing environment, a hypervisor, a device emulation, or a virtual machine executing on one or more physical computing devices. Moreover, although FIG. 1 depicts the data storage device(s) 120 as separate from the transaction management device(s) 108 and the client device(s) 102, in some implementations at least some of the functions of the client device(s) 102, the transaction management device(s) 108, and the data storage device(s) 120 may be performed on a same set of one or more computing devices. The data storage device(s) 120 are described further with reference to FIG. 4.

The key-value store 122 may be implemented on any number of the data storage device(s) 120. Implementations support any type of key-value store 122 in which objects store a value and are identified by a key that maps to or is otherwise associated with the value. The key-value store 122 may be implemented within at least a portion of the file system of one or more data storage devices 120. In such cases, an object may be a file, the file name may be a key, and the contents of the file may be a value associated with the key. In some implementations, the key-value store 122 may be distributed across multiple file systems of multiple data storage devices 120. The key-value store 122 may be managed using an implementation of the Dynamo structured storage system, such as the Apache Cassandra™ database management system provided by the Apache Software Foundation. In some cases, the key-value store 122 may be managed using DynamoDB, developed at Amazon.com of Seattle, Wash., USA. Implementations also support other types of the key-value store 122, including NoSQL data storage systems or databases such as an associative array, a map, a table, a hash map, a hash table, and so forth.

In some implementations, the key-value store 122 may be a consistent key-value store 122 that supports put, get, and delete operations to respectively write, retrieve, and remove data from the key-value store 122. In some implementations, the key-value store 122 may support put operations that are conditional put (cput) operations. In a conditional put operation, a current value of an object may first be retrieved. A new value may then be written to the object if its value at the time of the attempted write matches the previously retrieved current value, e.g., if the revision key 114 specified in the transaction 118 matches the revision key 114 currently stored in the object. Accordingly, a conditional put operation may not write to an object if its value has changed in the interim.

The key-value store 122 may include zero or more transaction objects 124, each corresponding to a transaction 118 that modifies data stored in the key-value store 122. The key-value store 122 may also include one or more data objects 126 that store data. Each transaction object 124 may be identified by a transaction object key 128. In some cases, the transaction object key 128 may be a UUID that uniquely identifies the transaction object 124. In some implementations, the transaction object key 128 may include a media access control (MAC) address or some other device ID of the transaction management device 108 that is executing the transaction 118 in response to the transaction request 106. The transaction object key 128 may be provided by the transaction management module(s) 116 that executes the transaction(s) 118. In some implementations, the transaction object key 128 may be generated by the key-value store 122. The transaction object 124 may comprise a transaction object value 130 that describes a current status of the transaction 118 corresponding to the transaction object 124. In some implementations, a transaction 118 may have one of three possible statuses: open, committed, or cancelled. Implementations also support the use of other statuses for the transactions 118. In some implementations, the transaction object 124 may also include a revision key indicating a revision or version of the transaction object value 130.

Each data object 126 may be identified by the key 110 that uniquely identifies the data object 126. In some cases, the key 110 may be the file name of the file that is the data object 126. Each data object 126 may comprise a value 132 that stores data for the data object 126. In the example of FIG. 1, the transaction 118 is executed to update the value 132 included in one or more data objects 126. The transaction 118 may create a new transaction object 124 to track the status of the transaction 118. The new transaction object 124 may be created with the transaction object value 130 "open" to indicate that the transaction 118 is in progress.

For each of the data objects 126 to be updated, the transaction 118 may modify the value 132 of the data object 126. In some implementations, the value 132 may be modified to store previous data 134, the updated data 112, and the transaction object key 128 corresponding to the transaction object 124 for the transaction 118. For example, a data object 126 may be identified by a key 110 "A", and prior to the transaction 118 the value 132 may be "1". The transaction 118 may be requested to store the value "3" at the key 110 "A". The transaction 118 may execute to alter the value 132 to "1,3:T1" where "1" is the previous data 134, "3" is the updated data 112, and "T1" is the transaction object key 128 for the transaction 118. Accordingly, in some implementations the value 132 of the data object 126 being altered may be employed to store the previous and updated state of the data object 126 during and after its modification by a transaction 118.

In some implementations, the data object 126 may also include the revision key 114 that indicates a revision or version of the updated data 112. The transaction 118 may fail if the revision key 114 specified in the transaction 118 does not correspond to the revision key 114 currently stored in the data object 126. If the transaction 118 is successful, it may replace the previously stored revision key 114 with a new revision key 114 to indicate a new revision of the updated data 112 stored in the value 132 of the data object 126. The updating of data object(s) 126 by the transaction(s) 118 is described further with reference to FIGS. 5-9.

Figure 2:
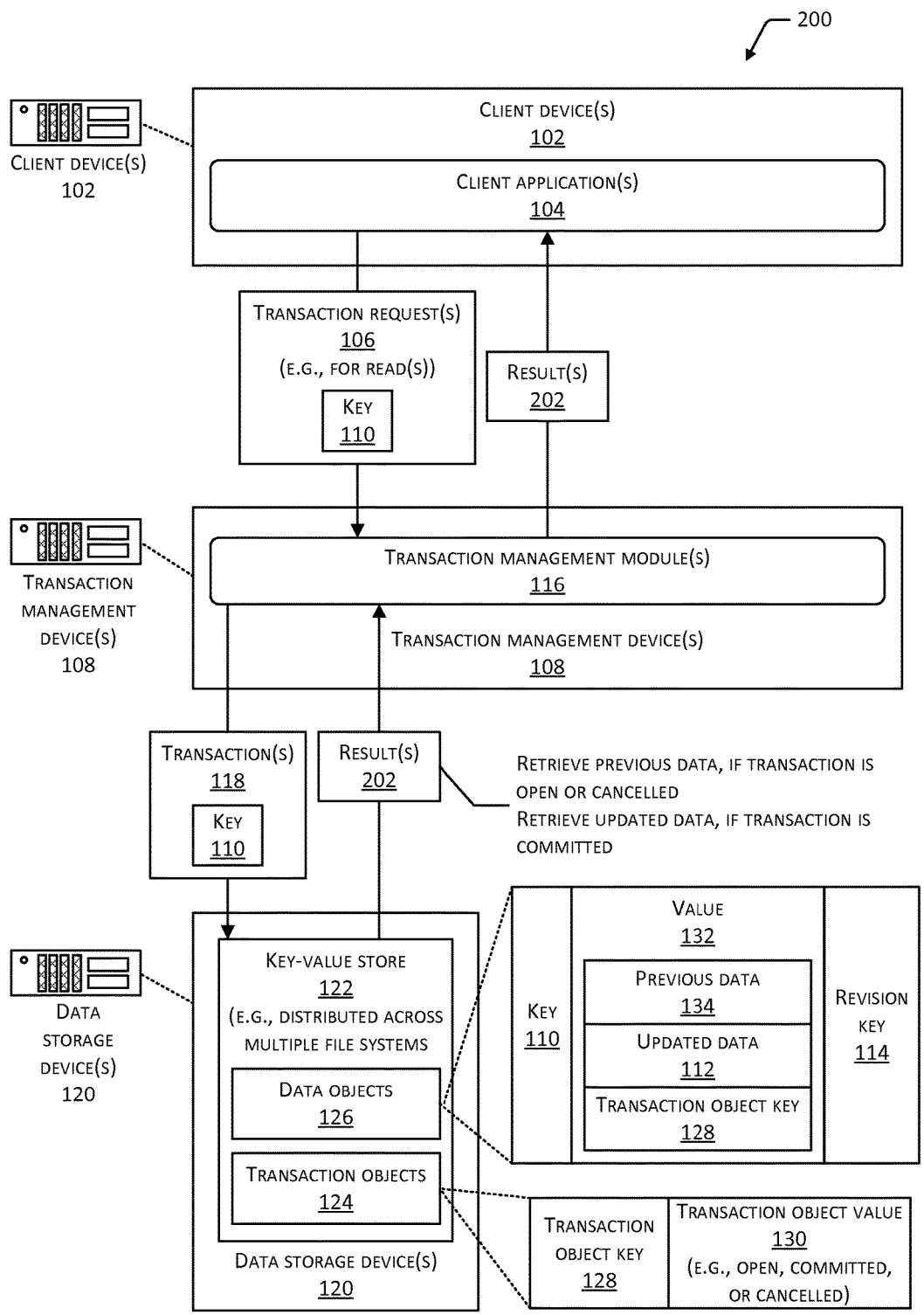
FIG. 2 depicts an environment for employing a key-value store for data storage and transaction management, and for performing a read transaction to retrieve data stored in the key-value store.

FIG. 2 depicts an environment 200. Elements of the environment 200 may have similar configurations and functions to like-numbered elements of the environment 100. In the example of FIG. 2, the transaction request(s) 106 are requesting read transaction(s) 118 to retrieve data from the key-value store 122. Each of the transaction request(s) 106 may include the key 110 that identifies the data object 126 for which the current value is to be retrieved. In some cases, the transaction request 106 may also specify the revision key 114 indicating a revision of the data to be read. For each received transaction request 106, the transaction management module(s) 116 may execute a transaction 118 that specifies the key 110 and, in some cases, the revision key 114. The transaction 118 may execute to retrieve a result 202 that is a current value of the data object 126 corresponding to the key 110 in the key-value store 122. In some implementations, the read transaction 118 may fail if the revision key 114 specified in the transaction 118 does not correspond to the revision key 114 currently stored in the data object 126.

In some cases, the value 132 of the data object 126 may indicate another transaction 118 that has executed or is in progress to update the data object 126. In such cases, the transaction object key 128 included in the value 132 may be retrieved and employed to access the corresponding transaction object 124. The transaction object value 130 may be retrieved from the transaction object 124. In cases where the transaction object value 130 indicates a status of "open" or "cancelled" for the other transaction 118, the result 202 may be the previous data 134. In cases where the transaction object value 130 indicates a status of "committed" for the other transaction 118, the result 202 may be the updated data 112 (e.g., the data written to the data object 126 by the other transaction 118). Accordingly, in some implementations the status of the other transaction 118 may determine the current value of the data object 126 to be provided as the result 202 to a requesting process. The result(s) 202 of the executed read transaction(s) 118 may be provided to the client device(s) 102 that requested the result(s) 202 in the transaction request(s) 106.

In some cases, a read transaction 118 may request the current value of a single key 110 for a data object 126 in the key-value store 122. Alternatively, the read transaction 118 may request the current values for multiple keys 110. In such cases, implementations support read transactions 118 to read multiple values in either a consistent or an inconsistent manner. In an inconsistent read of multiple values, the process may retrieve various values that are the results of various transaction(s) 118 that are in various states (e.g., open, cancelled, or committed) or that are the results of transaction(s) 118 that may commit while the read operation is being performed. In such cases, the read may not produce a set of result(s) 202 that are transactionally consistent with respect to multiple transactions. Such read operations are described further with reference to FIG. 10. Implementations also support a consistent read of multiple values by performing at least two passes over the data objects 126 to be read. Such read operations are described further with reference to FIG. 11.

The various devices of the environments 100 and 200 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environments 100 and 200 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

Implementations may operate using any number of transaction management device(s) 108 to execute transaction(s) 118 against the key-value store 122. In some implementations, the transaction management device(s) 108 may operate independently of one another without coordination or communication regarding which transaction management device(s) 108 are to execute transaction(s) 118 against which data object(s) 126. Accordingly, implementations may provide a transaction management system that supports the isolation property of the ACID criteria. Moreover, the state of the system may be managed through the key-value store 122, and the transaction management device(s) 108 may not maintain a state that is persistent from one transaction 118 to another. Implementations also forego the designation of a particular transaction management device 108 as a master transaction manager or coordinating transaction manager. Moreover, implementations forego the use of a common clock or global clock to synchronize time among multiple transaction management devices 108. Implementations also forego the use of any locking of data objects 126 to prevent the collision of multiple write operations against a data object 126.

Accordingly, implementations support the use of any number of the transaction management device(s) 108 for parallel transaction processing to achieve any rate of throughput in transaction processing. Implementations also provide for scalability in the storage capacity by supporting the use of any number of the data storage device(s) 120 to implement the key-value store 122. Implementations support any number of the data objects 126 and the transaction objects 124 stored in the key-value store 122, and any number of the data objects 126 modified or otherwise accessed by a transaction 118. Implementations support any number of open transactions 118 executing concurrently to modify the data stored in the key-value store 122.

Figure 3:
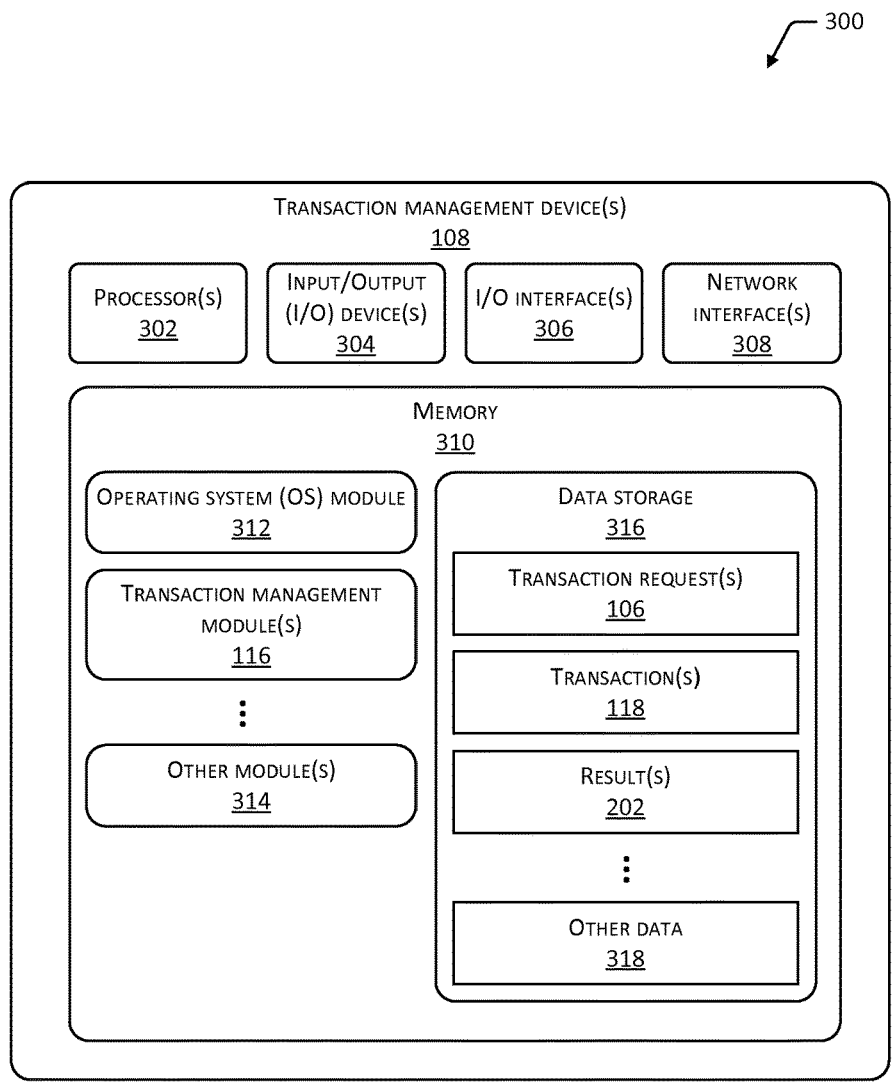
FIG. 3 depicts a block diagram of an example transaction management device that performs transactions to access data stored in a key-value store.

FIG. 3 depicts a block diagram 300 of an example of the transaction management device(s) 108. As shown in the block diagram 300, the transaction management device(s) 108 may include one or more processors 302 (e.g., hardware-based processor(s)) configured to execute one or more stored instructions. The processor(s) 302 may comprise one or more cores.

The transaction management device(s) 108 may include one or more input/output (I/O) devices 304. The I/O device(s) 304 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 304 may also include output devices such as a display, an audio output device (e.g., a speaker), a printer, a haptic output device, and so forth. The I/O device(s) 304 may be physically incorporated with the transaction management device(s) 108 or may be externally placed.

The transaction management device(s) 108 may include one or more I/O interfaces 306 to enable components or modules of the transaction management device(s) 108 to control, interface with, or otherwise communicate with the I/O device(s) 304. The I/O interface(s) 306 may enable information to be transferred in or out of the transaction management device(s) 108 or between components of the transaction management device(s) 108, through serial communication, parallel communication, or other types of communication. For example, the I/O interface(s) 306 may comply with a version of the RS-232 standard for serial ports, or with a version of the IEEE 1284 standard for parallel ports. As another example, the I/O interface(s) 306 may be configured to provide a connection over Universal Serial Bus (USB) or Ethernet. In some cases, the I/O interface(s) 306 may be configured to provide a serial connection that is compliant with a version of the IEEE 1394 standard. The transaction management device(s) 108 may also include one or more busses or other internal communications hardware or software that allow for the transfer of data between the various modules and components of the transaction management device(s) 108.

The transaction management device(s) 108 may include one or more network interfaces 308 that enable communications between the transaction management device(s) 108 and other network accessible computing devices such as the client device(s) 102 or the data storage device(s) 120. The network interface(s) 308 may include one or more network interface controllers (NICs) or other types of transceiver devices configured to send and receive communications over a network.

The transaction management device(s) 108 may include one or more memories, described herein as memory 310. The memory 310 comprises one or more computer-readable storage media (CRSM). The CRSM may include one or more of an electronic storage medium, a magnetic storage medium, an optical storage medium, a quantum storage medium, a mechanical computer storage medium, and so forth. The memory 310 provides storage of computer-readable instructions that may describe data structures, program modules, processes, applications, or other data for the operation of the transaction management device(s) 108. In some implementations, the memory 310 may provide storage of computer-readable instructions or other information in a non-transitory format.

The memory 310 may include an operating system (OS) module 312. The OS module 312 may be configured to manage hardware resources such as the I/O device(s) 304, the I/O interface(s) 306, and the network interface(s) 308, and to provide various services to applications, processes, or modules executing on the processor(s) 302. The OS module 312 may include one or more of the following: any version of the Linux™ OS; any version of iOS™ from Apple Corp. of Cupertino, Calif., USA; any version of Windows' or Windows Mobile' from Microsoft Corp. of Redmond, Wash., USA; any version of Android' from Google Corp. of Mountain View, Calif., USA and its derivatives from various sources; any version of Palm OS™ from Palm Computing, Inc. of Sunnyvale, Calif., USA and its derivatives from various sources; any version of BlackBerry OS™ from Research In Motion Ltd. of Waterloo, Ontario, Canada; any version of VxWorks™ from Wind River Systems of Alameda, Calif., USA; or other operating systems.

The memory 310 may include one or more of the modules described above as executing on the transaction management device(s) 108, such as the transaction management module(s) 116. The memory 310 may also include one or more other modules 314, such as a user authentication module or an access control module to secure access to the transaction management device(s) 108, and so forth.

The memory 310 may include data storage 316 to store data for operations of the transaction management device(s) 108. The data storage 316 may comprise a database, array, structured list, tree, or other data structure, and may be a relational or a non-relational datastore. The data storage 316 may store data such as that described above, including one or more of the transaction request(s) 106, the transaction(s) 118, or the result(s) 202. The data storage 316 may also store other data 318, such as user authentication information or access control data. In some implementations, at least a portion of the information stored in the data storage 316 may be stored externally to the transaction management device(s) 108, on other devices that may communicate with the transaction management device(s) 108 via the I/O interface(s) 306 or via the network interface(s) 308.

Figure 4:
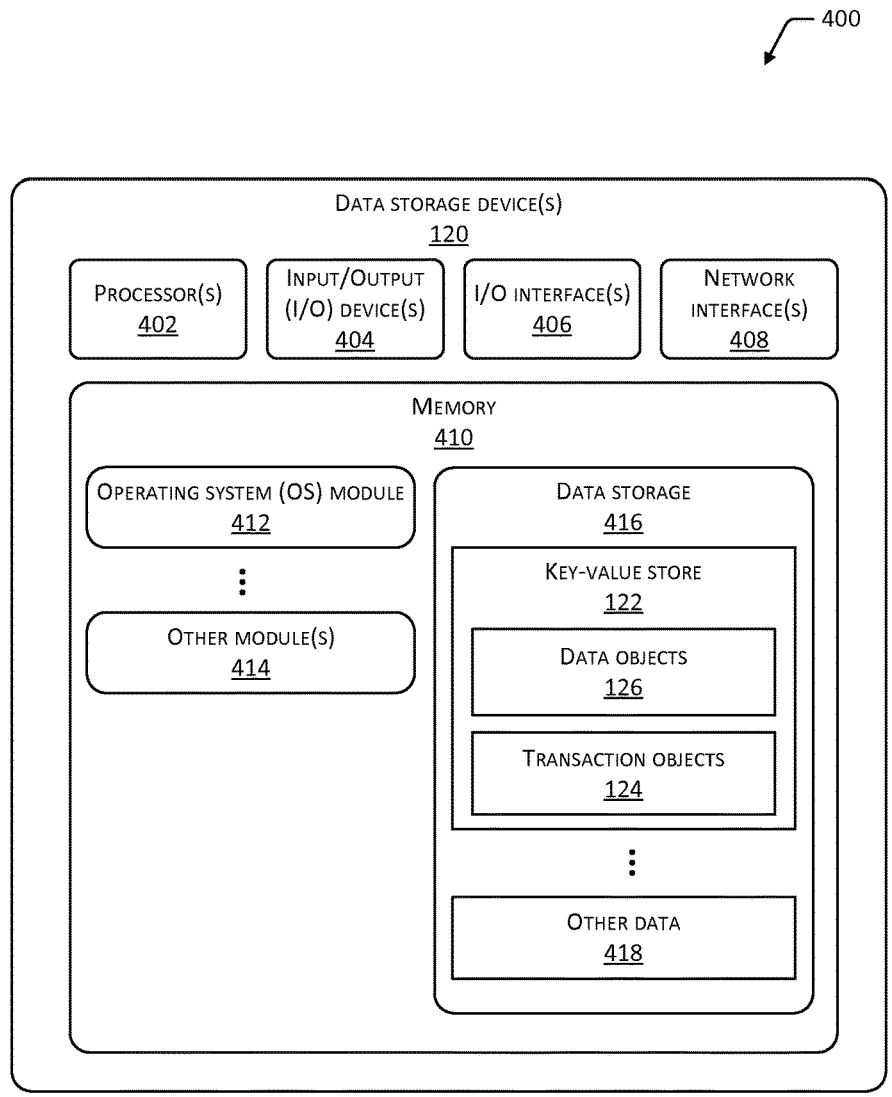
FIG. 4 depicts a block diagram of an example data storage device that is configured to provide a key-value store.

FIG. 4 depicts a block diagram 400 of an example of the data storage device(s) 120. As shown in the block diagram 400, the data storage device(s) 120 may include one or more processors 402 (e.g., hardware-based processor(s)) configured to execute one or more stored instructions. The processor(s) 402 may comprise one or more cores. The data storage device(s) 120 may include one or more I/O devices 404, one or more I/O interfaces 406, and one or more network interfaces 408 as described above respectively with reference to the I/O device(s) 304, the I/O interface(s) 306, and the network interface(s) 308.

The data storage device(s) 120 may include one or more memories, described herein as memory 410. The memory 410 comprises one or more CRSM, as described above with reference to the memory 310. The memory 410 may include an OS module 412 that is configured to manage hardware resources such as the I/O device(s) 404, the I/O interface(s) 406, and the network interface(s) 408, and to provide various services to applications, processes, or modules executing on the processor(s) 402. The OS module 412 may include one or more of the operating systems described above with reference to the OS module 312. The memory 410 may include one or more of the modules described above as executing on the data storage device(s) 120. The memory 410 may also include one or more other modules 414, such as a user authentication module or an access control module to secure access to the data storage device(s) 120, and so forth.

The memory 410 may include the data storage 416, which may store data for operations of the data storage device(s) 120. The data storage 416 may comprise a database, array, structured list, tree, or other data structure, and may be a relational or a non-relational datastore. The data storage 416 may store data such as that described above as present on the data storage device(s) 120, including the key-value store 122 storing any number of transaction objects 124 and data objects 126. The data storage 416 may also store other data 418, such as user authentication information or access control data. In some implementations, at least a portion of the information stored in the data storage 416 may be stored externally to the data storage device(s) 120, on other devices that may communicate with the data storage device(s) 120 via the I/O interface(s) 406 or via the network interface(s) 408.

Figure 5:
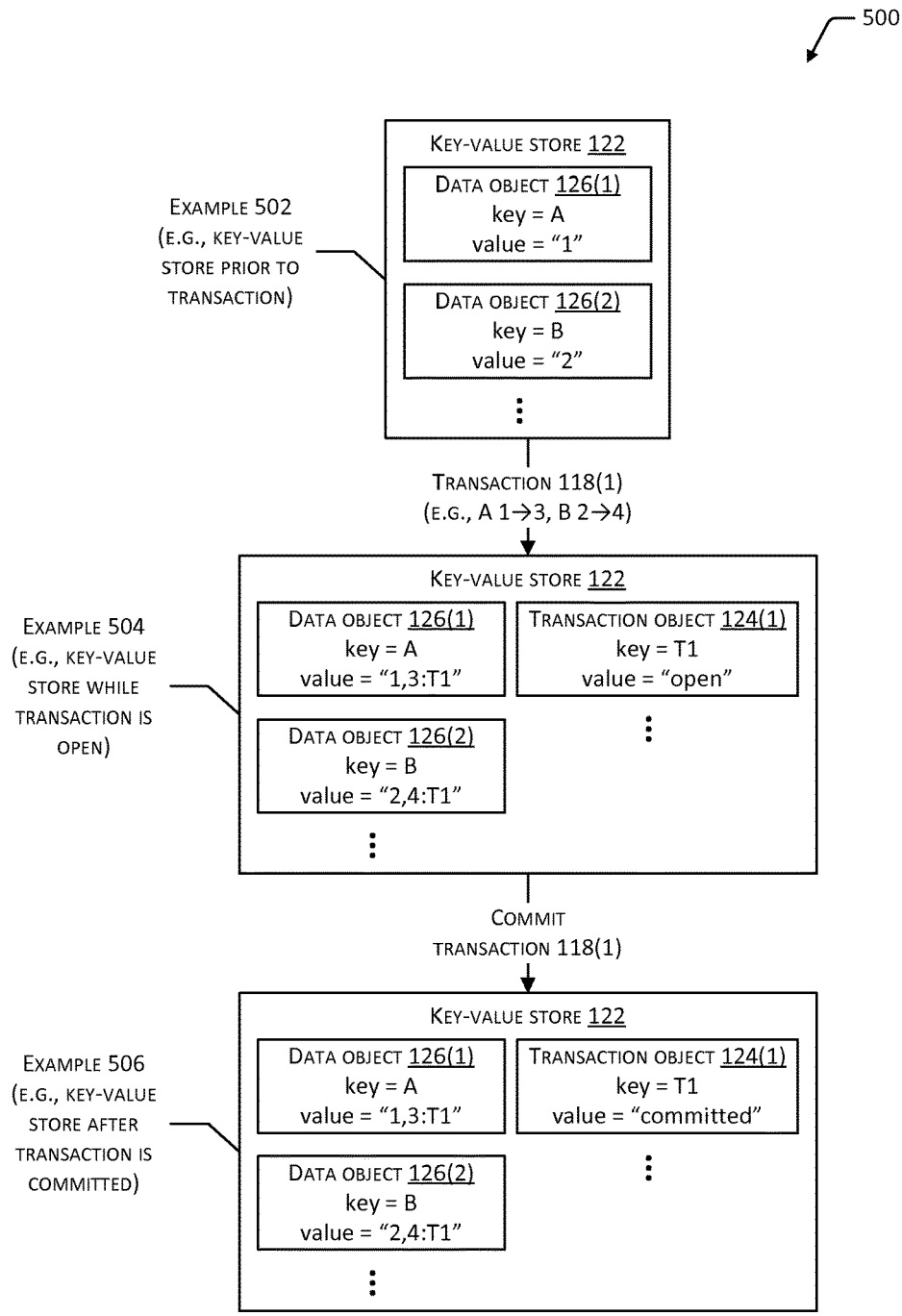
FIG. 5 depicts a first example transaction to modify data stored in a key-value store.

FIG. 5 depicts a schematic 500 illustrating the execution of an example transaction 118(1) to modify data stored in two example data objects 126(1) and 126(2). In this example, the data object 126(1) is identified by the key 110 "A" and the data object 126(2) is identified by the key 110 "B". Example 502 shows the state of a portion of the key-value store 122 (e.g., an initial state) prior to the transaction 118(1). In this state, the data object 126(1) stores the value 132 "1" and the data object 126(2) stores the value 132 "2".

The transaction 118(1) may include instructions to update the value stored at key "A" to "3", and update the value stored at key "B" to "4". The example 504 shows the state of a portion of the key-value store 122 after the transaction 118(1) has been initiated, e.g., while the transaction 118(1) is open. The transaction 118(1) may create a new transaction object 124(1), with a transaction object key 128 of "T1", to indicate the status of the transaction 118(1) as "open". The transaction 118(1) may modify the value 132 of the data object 126(1) to "1,3:T1", including the previous data 134 stored in the data object 126(1), the updated data 112 stored in the data object 126(1), and the transaction object key 128. The transaction 118(1) may modify the value 132 of the data object 126(2) to "2,4:T1", including the previous data 134 stored in the data object 126(2), the updated data 112 stored in the data object 126(2), and the transaction object key 128.

The status of the transaction object 124(1) may remain "open" until the transaction 118(1) has successfully completed updates for all the keys 110 specified in the transaction 118(1). Then, the transaction 118(1) may be committed. In some implementations, committing the transaction 118(1) may include altering the status of the transaction object 124(1) from "open" to "committed", as shown in example 506. If the transaction 118(1) fails to update any of the data object(s) 126, the status of the transaction object 124(1) may be altered from "open" to "cancelled", indicating that the transaction 118(1) has failed to perform all of its updates. If a read transaction 118 is executed against any of the data objects 126 while the transaction 118(1) is open, the returned result(s) 202 include the previous data 134 (e.g., "1" or "2"). If a read transaction 118 is executed against any of the data objects 126 after the transaction 118(1) is committed, the returned result(s) 202 include the updated data 112 (e.g., "3" or "4"). Accordingly, implementations provide for atomicity in transaction processing, such that a single operation of altering the transaction object value 130 from "open" to "committed" enables the changes to each of the data objects 126 affected by the transaction 118(1). If a read transaction 118 is executed against any of the data objects 126 after the transaction 118(1) is cancelled, the returned result(s) 202 include the previous data 134 (e.g., "1" or "2"). Thus, from the perspective of an external reading process, a cancelled transaction 118(1) may not affect the state of the data stored in the key-value store 122.

In some implementations, as shown in FIG. 5, a transaction object 124 may be created at the start of the transaction 118. Alternatively, a transaction object 124 may be created after the data object(s) 126 are updated according to the transaction 118. In some cases, the transaction object 124 may not be created until after the transaction 118 is committed. After the data object(s) 126 have been updated according to the transaction 118, the transaction object 124 may be created with a transaction object value 130 of "committed" if the update(s) are successful. Alternatively, the transaction object 124 may be created with a transaction object value 130 of "cancelled" if at least one update is unsuccessful. In such implementations, a subsequent transaction 118 attempting to update the data object(s) 126 may read a transaction object key 128 from the data object(s) 126 and attempt to read the referenced transaction object(s) 124.

If the transaction 118 does not find the referenced transaction object(s) 124, the process may infer that the referenced transaction(s) 118 are open. Accordingly, some implementations may employ an assumption that a transaction 118 is open if a transaction object 124 has not yet been created for the transaction 118. Alternatively, in some implementations a transaction 118 may be assumed to be committed if a corresponding transaction object 124 does not exist. In such implementations, the transaction object 124 may be created with a status of "open" by a transaction 118, and the transaction object 124 may be deleted when the transaction 118 commits.

Figure 6:
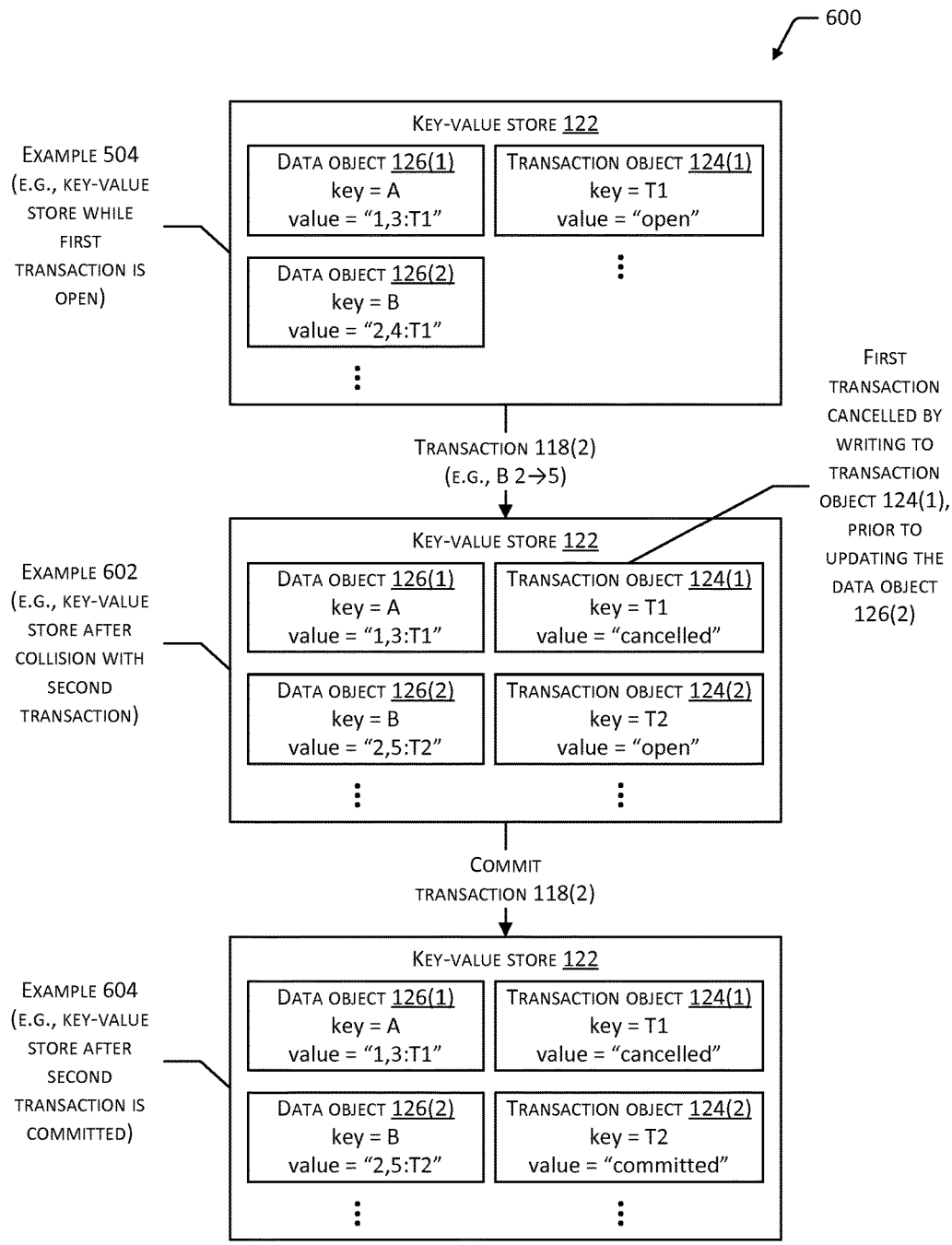
FIG. 6 depicts a second example transaction to modify data stored in a key-value store.

FIG. 6 depicts a schematic 600 illustrating the execution of another example transaction 118(2) to modify data stored in the example data object 126(2). In this example, the transaction 118(2) may include instructions to update the value stored at key "B" to "5". As shown in the example 504, the transaction 118(2) may begin executing while the status of the first transaction 118(1) is open as indicated by the transaction object value 130 of the transaction object 124(1). Accordingly, FIG. 6 depicts a scenario in which two transactions 118(1) and 118(2) collide in attempting to update the same data object 126(2) to different values. Example 602 shows the state of a portion of the key-value store 122 during such a collision.

As shown in the example 602, the transaction 118(2) may create a new transaction object 124(2) (e.g., key of "T2") that indicates an open status of the transaction 118(2). The transaction 118(2) may access the value 132 of the data object 126(2) (e.g., identified by key "B") and determine that the value includes the transaction object key 128 "T1" for the transaction 118(1). The transaction 118(2) may access the transaction object 124(1) based on the key "T1" and determine a currently open status of the transaction 118(1). In some implementations, the collision may be resolved by the second (e.g., later executed) transaction 118(2) cancelling the first (e.g., earlier executed) transaction 118(1). Accordingly, as shown in the example 602, the transaction 118(2) may change the status of the transaction object 124(1) to "cancelled". The transaction 118(2) may also modify the value 132 of the data object 126(2) to "2,5:T2", including the previous data 134, the updated data 112 specified in the transaction 118(2), and the transaction object key 128 for the transaction 118(2). In this example, the transaction 118(2) leaves the data object 126(1) unaltered. As shown in example 604, after the transaction 118(2) has successfully updated the data object 126(2), the transaction 118(2) may commit by updating the transaction object 124(2) to "committed".

In some implementations, the execution of the transaction 118(2) may first cancel the previous transaction 118(1) by modifying the transaction object 124(1) to "cancelled". The transaction 118(2) may then update the data object 126(2). As described above, some implementations may incorporate an assumption that a transaction 118 is still open if there is no transaction object 124 created for the transaction object key 128 referenced by a data object 126. In such implementations, the transaction object 124(1) may not be present in example 504. At example 602, the transaction 118(2) may create the transaction object 124(1) with a state of "cancelled" based on an assumption that the transaction 118(1) is open, after not finding the transaction object 124(1) with key "T1".

Although FIG. 6 depicts an example in which an open first transaction 118(1) is cancelled by a second transaction 118(2) seeking to update the same data object(s) 126, implementations are not so limited. In some implementations, a transaction object 124(1) may include a flag or other indication requesting politeness from a subsequent transaction 118(2). Such a politeness flag may indicate that the subsequent transaction 118(2) may not immediately cancel the first transaction 118(1), and may instead wait a predetermined time period before cancelling the first transaction 118(1).

Figure 7:
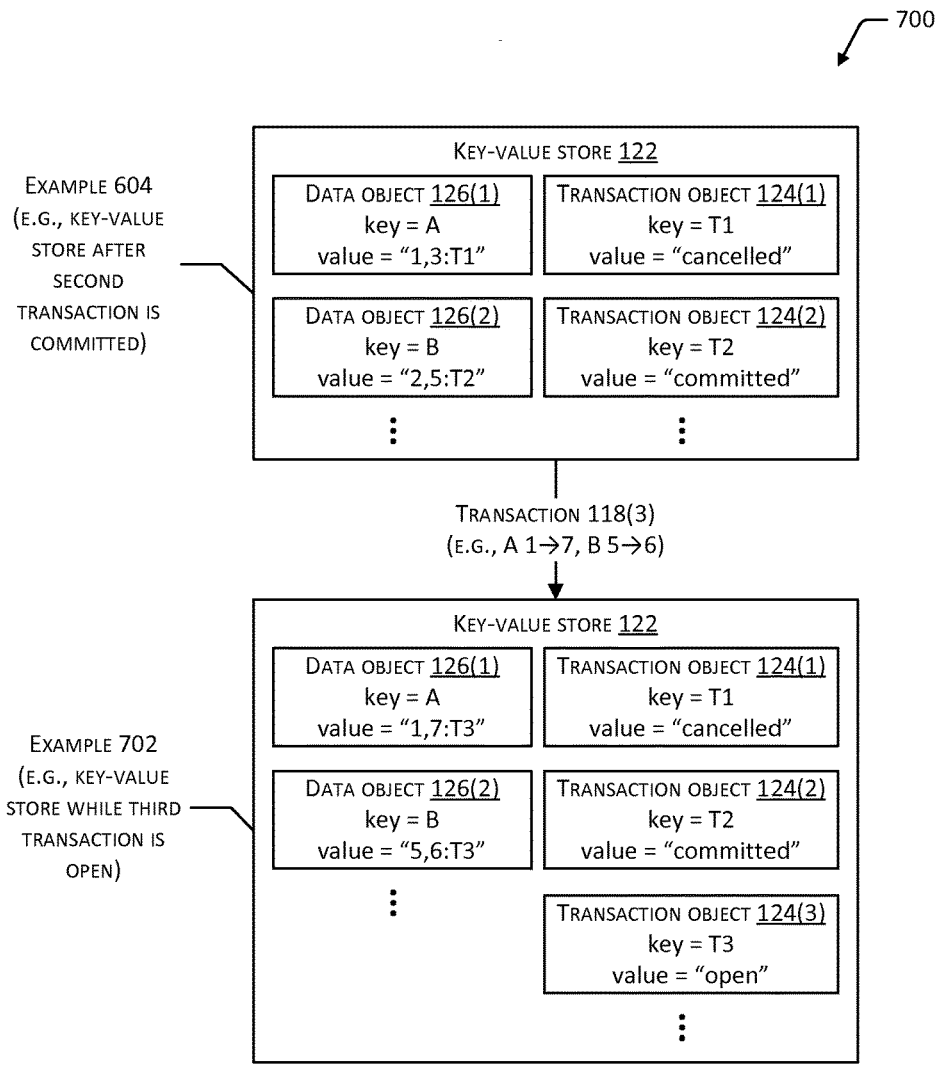
FIG. 7 depicts a third example transaction to modify data stored in a key-value store.

FIG. 7 depicts a schematic 700 illustrating the execution of another example transaction 118(3) to modify data stored in the example data objects 126(1) and 126(2). In this example, the transaction 118(3) may include instructions to update the value stored at key "A" to "7" and the value stored at key "B" to "6". In this example, the transaction 118(3) may begin executing after the second transaction 118(2) has committed and after the second transaction 118(2) has cancelled the first transaction 118(1). As shown in example 702, the transaction 118(3) may create a transaction object 124(3) to indicate an open status of the transaction 118(3).

The transaction 118(3) may access the value 132 "1,3:T1" of the data object 126(1) (e.g., identified by key "A"), and retrieve the transaction object key 128 "T1" included in the current value 132. Based on the transaction object 124(1), the transaction 118(3) may determine that the status of the transaction 118(1) "T1" is cancelled. Accordingly, the transaction 118(3) may discard or ignore the updated data 112 "3" and modify the value 132 from "1,3:T1" to "1,7:13", including the previous data 134, the updated data 112 specified in the transaction 118(3), and the transaction object key 128 "T3" for the transaction 118(3). Accordingly, in some implementations a previous, cancelled transaction 118(1) may not affect subsequent updates against the data object(s) 126 specified in the cancelled transaction 118(1).

The transaction 118(3) may access the value 132 "2,5:T2" of the data object 126(2) (e.g., identified by key "B"), and retrieve the transaction object key 128 "T2" included in the current value 132. Based on the transaction object 124(2), the transaction 118(3) may determine that the status of the transaction 118(2) "T2" is committed. Accordingly, the transaction 118(3) may discard or ignore the previous data 134 "2" and modify the value 132 from "2,5:T2" to "5,6:T3", including the previously updated data 112 as the new previous data 134, the updated data 112 specified in the transaction 118(3), and the transaction object key 128 "T3" for the transaction 118(3). Accordingly, in some implementations a subsequent transaction 118(3) may be described as cleaning up the results of a previous, committed transaction 118(2) with respect to the value 132 of the data object 126(2).

Each of the transactions 118 described in FIGS. 5-7 may assert, in the course of updating data object(s) 126, that the data object(s) 126 hold particular values prior to the updates. A transaction 118 may fail if the current value prior to the update is not the same as the value being asserted by the transaction 118. For example, the transaction 118(3) shown in FIG. 7 may assert that the value of key "A" is "1" and that the value of key "B" is "5". The transaction 118(3) may fail if either of those assertions are false, e.g., if transaction 118(1) had succeeded in updating key "A" from "1" to "3" instead of having been cancelled, or if the transaction 118(2) had failed in updating key "B" from "2" to "5" instead of having been committed. Such assertions may be based on the revision key 114 included in the transaction(s) 118.

Although the examples of FIGS. 5-7 depict particular characters being employed as a delimiter (e.g., a comma) between the previous data 134 and the updated data 112, and as a delimiter (e.g., a colon) between the updated data 112 and the transaction object key 128, implementations are not limited to these examples. Implementations support the use of any delimiting characters or sequences of characters to separate the various elements of the value 132. In some cases, where particular characters or character sequences are designated as delimiters to separate the elements of the value 132, instances of such characters or character sequences may be escaped or otherwise flagged by designated escape characters (e.g., a slash or backslash) where they occur in the data to be stored. In some implementations, one or more of the previous data 134, the updated data 112, or the transaction object key 128 may have a predetermined length enabling the particular elements of the value 132 to be identified without employing delimiters.

Moreover, although the examples of FIGS. 5-7 depict the keys 110, the values 132, the transaction object keys 128, and the transaction object values 130 as having a particular length, size, format, or data type, implementations are not limited to these examples. Implementations support the use of any type, length, size, or format for the keys 110, the values 132, the transaction object keys 128, and the transaction object values 130.

Figure 8:
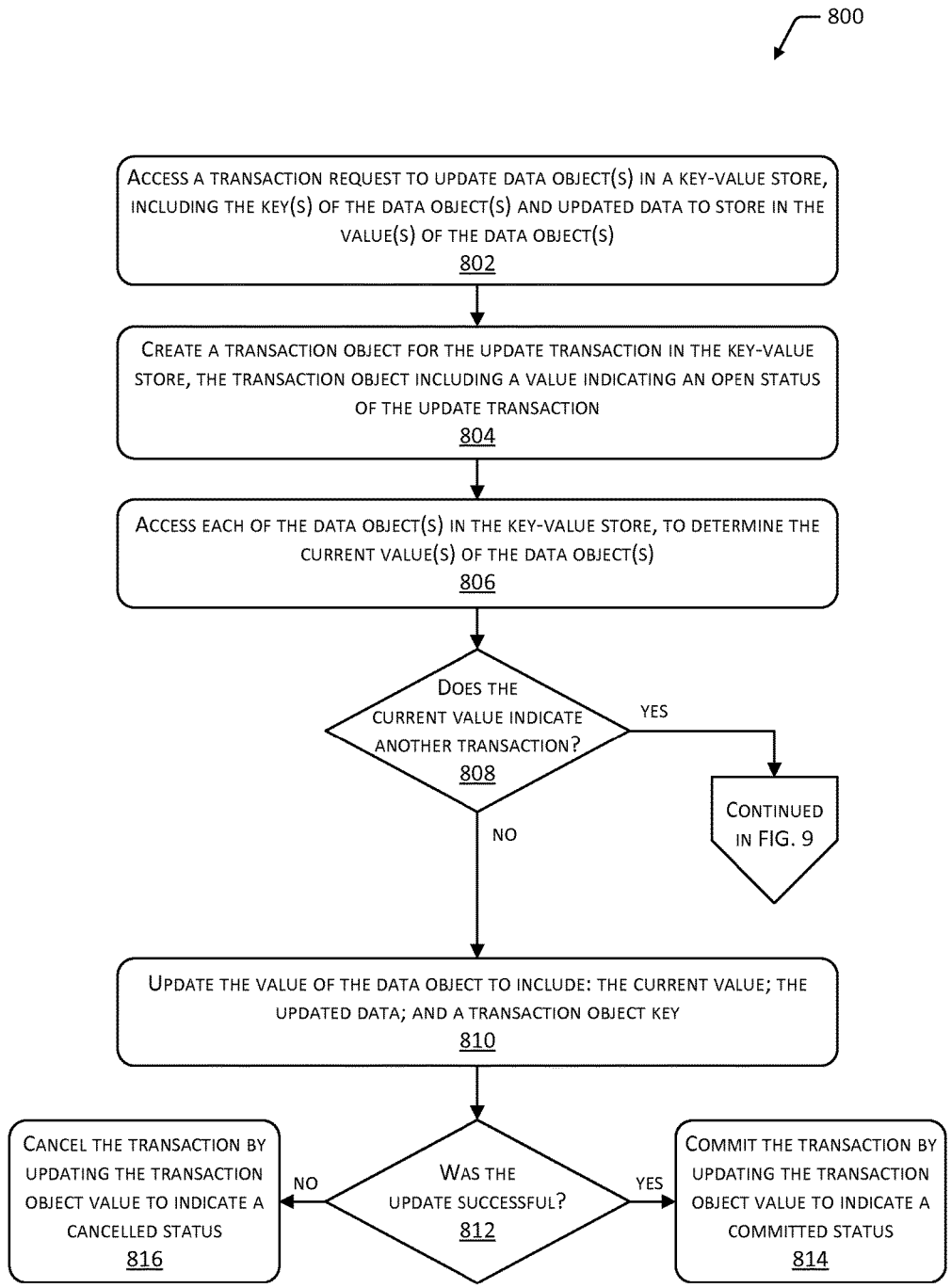
FIG. 8 depicts a flow diagram of a process for modifying a data object of a key-value store based on a transaction.

FIG. 8 depicts a flow diagram 800 of a process for modifying a data object 126 of a key-value store 122 based on a transaction 118. Operations of the process may be performed by the transaction management module(s) 116, other modules executing on the transaction management device(s) 108, or other modules executing on other devices.

At 802, a transaction request 106 may be received or otherwise accessed. As described with reference to FIG. 1, the transaction request 106 may be generated by a client application 104 executing on a client device 102. The transaction request 106 to update one or more data objects 126 may include the key(s) 110 that identify the data object(s) 126 to be updated. The transaction request 106 may also include the updated data 112 for the data object(s) 126. In some implementations, the transaction request 106 may include the previous data 134 (e.g., the data currently stored in the data object(s) 126). Based on the transaction request 106, a transaction 118 may be executed to perform the requested update(s).

At 804, the transaction 118 may execute and create a transaction object 124 in the key-value store 122. The transaction object 124 may include the transaction object value 130 to indicate the status of the transaction 118. At 804, the transaction object 124 may be created with a transaction object value 130 of "open" to indicate an open status of the transaction 118. The process may proceed as described below for each of the data object(s) 126 referenced in the transaction request 106. As described above, in some implementations the transaction object 124 may not be created until the transaction 118 is either cancelled or committed.

At 806, the data object 126 is accessed in the key-value store 122 to determine the current value 132 of the data object 126. The data object 126 may also be accessed to determine the revision key 114 currently referenced by the data object 126. The operation at 806 may be omitted in cases where there is no asserted previous value of the data object(s) 126, e.g., where the asserted previous value is null or where the transaction 118 asserts that the data object(s) 126 do not currently exist for the key(s) 110 referenced in the transaction 118. In this way, a transaction 118 may request that new data object(s) 126 be added to the key-value store 122 for one or more keys 110.

At 808, a determination is made whether the current value 132 indicates that another transaction 118 has executed or is executing to modify the data object 126, e.g., whether the value 132 includes a transaction object key 128. If so, the process may continue as described with reference to FIG. 9. If the value 132 does not indicate another transaction 118, such as the state of the data objects 126 in the example 502, the process may proceed to 810.

At 810, the transaction 118 may retrieve the current value 132 of the data object 126. The transaction 118 may then update the value 132 of the data object 126 to include: the current value 132, now indicated as the previous data 134; the updated data 112 specified in the transaction request 106; and the transaction object key 128 for the transaction object 124 created at 804.

At 812, a determination is made whether the update at 810 was successful. If so, the process may proceed to 814 and commit the transaction 118. Committing the transaction 118 may include updating the transaction object value 130 of the transaction object 124 to indicate a committed status. If the update at 810 was not successful, the process may proceed to 816 and cancel the transaction 118. Cancelling the transaction 118 may include updating the transaction object value 130 of the transaction object 124 to indicate a cancelled status. In some implementations, the transaction request 106 may include the revision key 114. In such cases, a transaction 118 may be determined to have failed if the revision key 114 specified in the transaction request 106 does not correspond to the revision key 114 of the data object 126, for any data object 126 specified in the transaction request 106. In some implementations, the client application 104 that generated the transaction request 106 may be notified whether the transaction 118 succeeded or failed to perform the requested updates.

Figure 9:
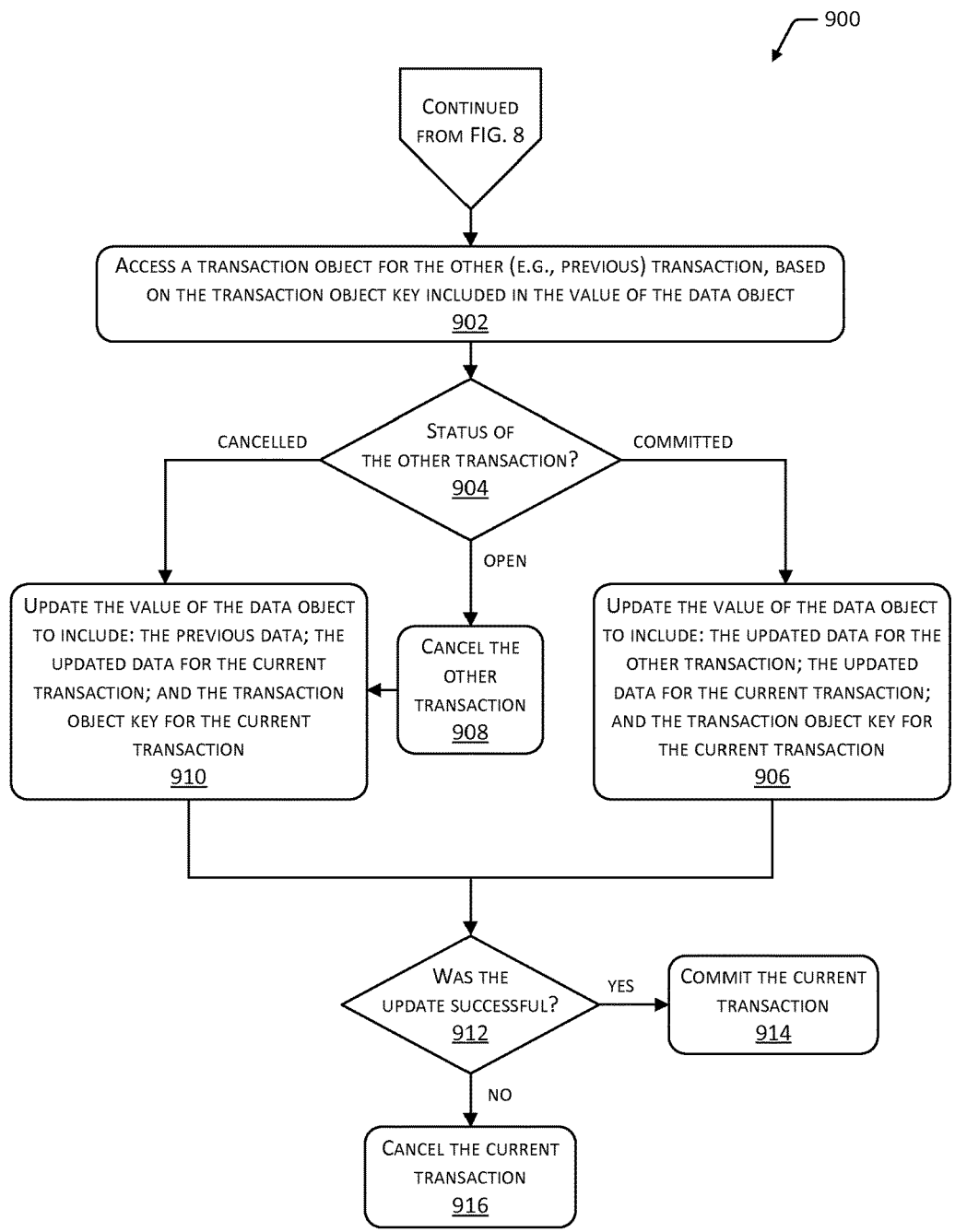
FIG. 9 depicts a flow diagram of a process for modifying a data object of a key-value store based on a transaction, in cases where the data object references another transaction.

FIG. 9 depicts a flow diagram 900 of a process for modifying a data object 126 of a key-value store 122 based on a transaction 118(2), in cases where the data object 126 references another transaction 118(1). Operations of the process may be performed by the transaction management module(s) 116, other modules executing on the transaction management device(s) 108, or other modules executing on other devices.

At 902, a transaction object 124 is accessed based on the transaction object key 128 indicated in the value 132 of the data object 126 as determined at 808. The reference to the transaction object 124 in the value 132 indicates that the data object 126 was the object of a previous modification, a previous attempt at modification, or an attempted in-progress modification by another transaction 118(1).

At 904, the status of the other transaction 118(1) is determined based on the transaction object value 130 of the transaction object 124 corresponding to the other transaction 118(1). If the status is committed, the process may proceed to 906. If the status is open, the process may proceed to 908. If the status is cancelled, the process may proceed to 910.

At 906, the value 132 of the data object 126 is updated to include: the updated data 112 resulting from execution of the previous transaction 118(1); the updated data resulting from execution of the current transaction 118(2); and the transaction object key 128 that identifies the transaction object 124 for the current transaction 118(2). The process may then proceed to 912.

If the status of the other transaction 118(1) is open, at 908 the other transaction 118(1) may be cancelled. As described above, the other transaction 118(1) may be cancelled by updating transaction object value 130 of the transaction object 124 to "cancelled". The process may then proceed to 910.

At 910, the value 132 of the data object 126 is updated to include: the previous data 134; the updated data 112 resulting from execution of the current transaction 118(2); and the transaction object key 128 that identifies the transaction object 124 for the current transaction 118(2). The process may then proceed to 912.

At 912, a determination is made whether the update at 906 or 910 was successful. If so, the process may proceed to 914 and commit the transaction 118(2) as described with reference to 814. If the update was not successful, the process may proceed to 916 and cancel the transaction 118(2) as described with reference to 816. In some implementations, the client application 104 that generated the transaction request 106 may be notified whether the transaction 118(2) succeeded or failed to perform the requested updates. In some cases, if the cancelling of the other transaction 118(1) failed at 908, a determination may be made that the update at 910 has also failed and the current transaction 118(2) may be cancelled.

Figure 10:
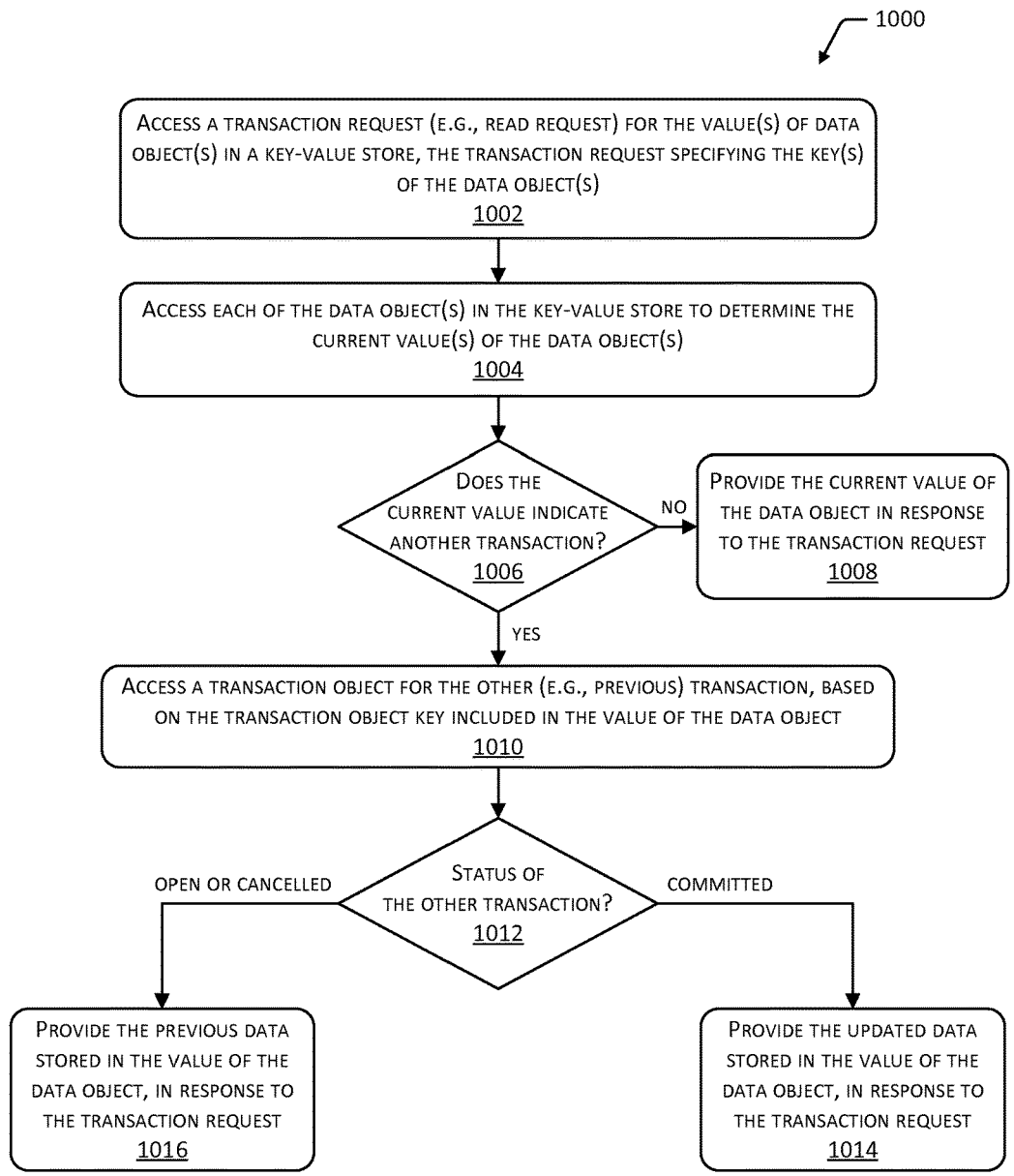
FIG. 10 depicts a flow diagram of a process for retrieving data stored in a data object of a key-value store.

FIG. 10 depicts a flow diagram 1000 of a process for retrieving data stored in a data object 126 in a key-value store 122. Operations of the process may be performed by the transaction management module(s) 116, other modules executing on the transaction management device(s) 108, or other modules executing on other devices.

At 1002, a transaction request 106 may be received or otherwise accessed. As described with reference to FIG. 2, the transaction request 106 may be generated by a client application 104 requesting a current value of one or more data objects 126 corresponding to one or more keys 110. The transaction request 106 to retrieve the value(s) of one or more data objects 126 may include the key(s) 110 that identify the data object(s) 126 to be read. Based on the transaction request 106, a transaction 118 may be executed to perform the requested read(s).

At 1004, the transaction 118 may access the data object(s) 126 in the key-value store 122 to determine the value(s) 132 stored in the data object(s) 126. The process may proceed as described below for each of the data object(s) 126 referenced in the transaction request 106.

At 1006, a determination is made whether the current value 132 of the data object 126 indicates that another transaction 118 has executed or is executing to modify the data object 126, e.g., whether the value 132 includes a transaction object key 128. If so, the process may proceed to 1010. If the value 132 does not indicate another transaction 118, such as the state of the data objects 126 in the example 502, the process may proceed to 1008. At 1008, the current value 132 of the data object 126 may be provided as at least a portion of the result(s) 202 in response to the transaction request 106.

At 1010, a transaction object 124 is accessed based on the transaction object key 128 indicated in the value 132 of the data object 126 as determined at 1006. The reference to the transaction object 124 in the value 132 indicates that the data object 126 was the object of a previous modification, a previous attempt at modification, or an attempted in-progress modification by another transaction 118.

At 1012, the status of the other transaction 118 is determined based on the transaction object value 130 of the transaction object 124 corresponding to the other transaction 118. If the status is committed, the process may proceed to 1014. If the status is open or cancelled, the process may proceed to 1016. At 1014, the updated data 112 is provided as at least a portion of the result(s) 202 in response to the transaction request 106, because the other transaction 118 is committed. At 1016, the previous data 134 is provided as at least a portion of the result(s) 202 in response to the transaction request 106, because the other transaction 118 is not committed.

The process of FIG. 10 may provide a consistent read of a single data object 126 referenced by a single key 110. The process of FIG. 10 may also provide a consistent read of multiple data objects 126 referenced by multiple keys 110 in cases where no other transactions 118 affecting the data objects 126 are being committed during the read operations. In cases where one or more other transactions 118 affecting the data objects 126 are committed during the read operations, the process of FIG. 10 may provide an inconsistent read across the multiple data objects 126.

Figure 11:
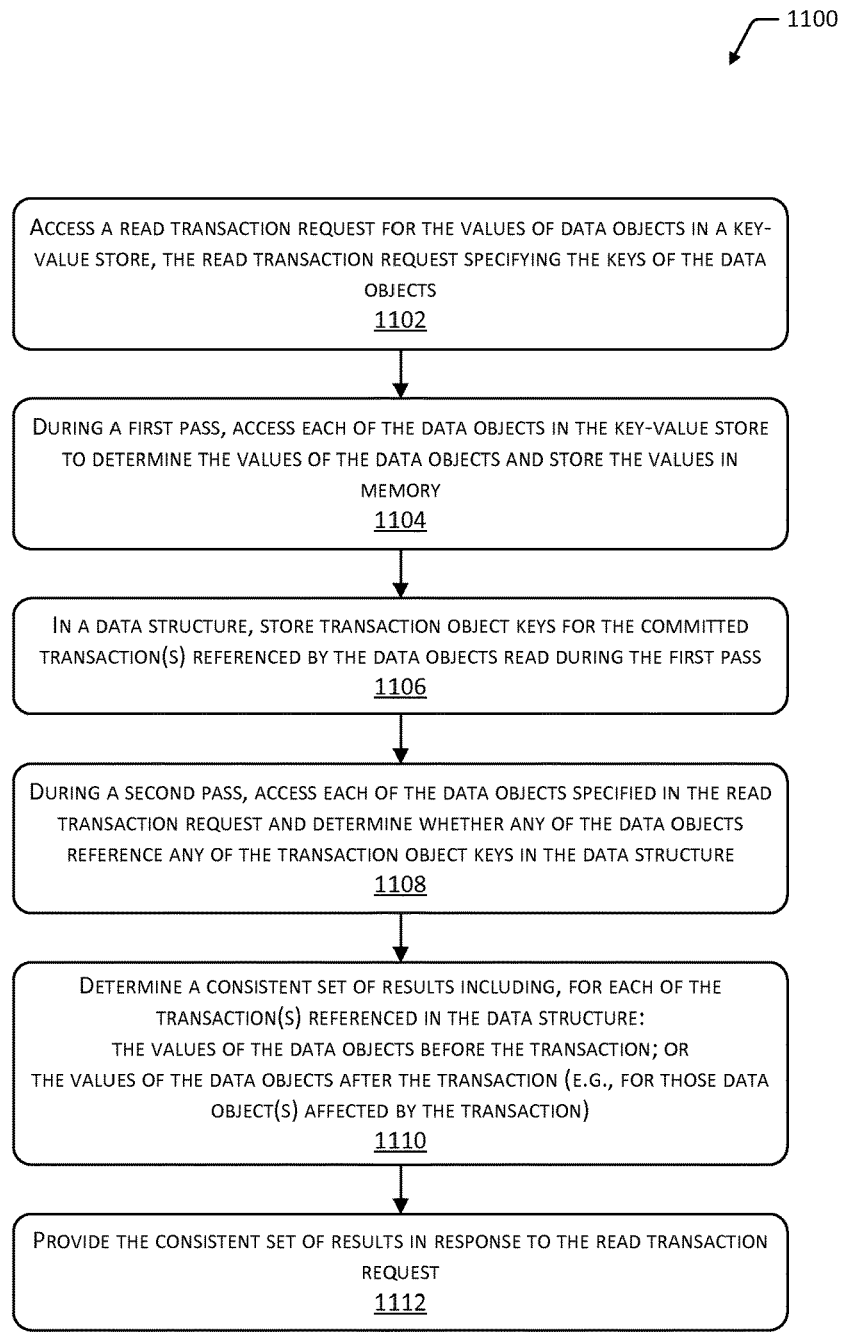
FIG. 11 depicts a flow diagram of a process for consistently reading multiple data objects stored in a key-value store.

FIG. 11 depicts a flow diagram 1100 of a process for consistently reading multiple data objects 126 stored in the key-value store 122 by performing at least two passes to read the data objects 126. Operations of the process may be performed by the transaction management module(s) 116, other modules executing on the transaction management device(s) 108, or other modules executing on other devices.

In the process of FIG. 11, two passes are made to read the values of a set of data objects 126 and determine whether any write transactions 118 have updated the values 132 of the data objects 126 while the reads are in progress. Such a double pass read process may operate to generate a consistent set of result(s) 202 in response to a read transaction request 106. In the consistent set of result(s) 202, the effects of each ongoing transaction 118 may be fully included in the result(s) 202 or fully excluded from the result(s) 202. Accordingly, the consistent set of result(s) 202 may reflect a state of the key-value store 122 after a transaction 118 is committed or before the transaction 118 is executed, for each of the ongoing transactions 118.

At 1102, a read transaction request 106 may be received or otherwise accessed. As described with reference to 1002, the read transaction request 106 may request the values 132 of data objects 126 by specifying the keys 110 of the various data objects 126 to be read.

At 1104, a first pass may be made over the data objects 126 referenced in the read transaction request 106. During the first pass, each of the data objects 126 may be accessed to determine the values 132 of the data objects 126. The values 132 may be stored in memory, the values 132 including the previous data 134 and the updated data 112 in cases where the data object 126 references a write transaction 118. In some cases, the data objects 126 being read may be in the process of being modified by other write transactions 118 during the read.

At 1106, during the first pass the transaction object key(s) 128 referenced by the data objects 126 are stored for each transaction 118 that has a committed status. As described above, the status of each transaction 118 may be determined by reading the transaction object value 130 in the transaction object 124 for each of the transaction object key(s) 128 referenced by the data objects 126. The transaction object key(s) 128 for the committed transaction(s) 118 may be stored in a data structure such as a list or a table.

In some cases, while reading during the first pass the process may read a value 132 in a first data object 126 that does not include a reference to a write transaction 118 even though a second data object 126 may include the reference to the write transaction 118. In such cases, the write transaction 118 may update the first data object 126 after the first pass has read the first data object 126, such that the process may not detect that the first data object 126 was updated by the write transaction 118 during the first pass. To account for such scenarios, the process may perform a second pass to read the data objects 126.

At 1108, during a second pass each of the data objects 126 specified in the read transaction request 106 may be read again to determine whether any of the data objects 126 references any of the transaction object keys 128 stored in the data structure at 1106. The second pass may read the data objects 126 in the same order as the first pass, or in a different order. In some cases, the second pass may read the data objects 126 in an opposite order from the first pass.

At 1110, a consistent set of result(s) 202 is determined. The consistent set of result(s) 202 may include, for each of the transactions 118 referenced in the data structure, the values 132 of the data objects 126 before the transaction 118 (e.g., the previous data 134) or the values 132 of the data objects 126 after the transaction 118 (e.g., the updated data 112, for those data object(s) 126 that are affected by the transaction 118). In this way, implementations may determine a set of result(s) 202 that is consistent with respect to each of the transactions 118 that may have affected the data objects 126 during the first pass.

At 1112, the consistent set of result(s) 202 determined at 1110 is provided in response to the read transaction request 106.

In some cases there may be a choice as to whether the result(s) 202 include values 132 after a transaction 118 or before a transaction 118. Some implementations may include a preference to include those values 132 that reflect a state after a transaction 118, where such values 132 would reflect a consistent state with respect to the transaction 118. In some cases, the second pass may detect that another transaction 118 has operated to modify one or more of the data objects 126, the other transaction 118 not having been detected during the first pass. In such cases, the read transaction 118 may fail to avoid returning a potentially inconsistent set of result(s) 202.

The following example illustrates the process of FIG. 11. In the example, three data objects 126 with keys 110 of "A", "B", and "C" may store values 132 of v0A, v0B, and v0C respectively at a time0. A transaction 118 "T1" may modify the value of "A" from v0A to v2A at a time2, may modify the value of "C" from v0C to v1C at a time1 prior to time2, and may not modify the value of "B". T1 may commit at time3 after modifying "A" and "C".

In cases where "A", "B", and "C" are read using a single pass read (e.g., as described in FIG. 10), the reader may read "A", "B", and "C" in an order such that the reader determines a value of v0A for "A" and a value of v1C for "C". Accordingly, a single pass read may produce results that are inconsistent with respect to T1. In contrast, a consistent set of results would include v0A and v0C for "A" and "C" (e.g., prior to T1), or v2A and v1C for "A" and "C" (e.g., after T1 is committed).

To provide a consistent set of results, a second pass may be performed to read the values of "A", "B", and "C". During the second pass, the reader may detect that T1 modified "A" at some time after the first pass read "A", and an inference may be made that T1 was ongoing during the first pass. If during the second pass a determination is made that T1 has committed, then the second pass may generate a set of results that includes the consistent post-T1 values for "A" and "C". If during the second pass a determination is made that T1 has not yet committed (e.g., is still open or has been cancelled), then the second pass may generate a set of results that includes the consistent pre-T1 values for "A" and "C".

Figure 12:
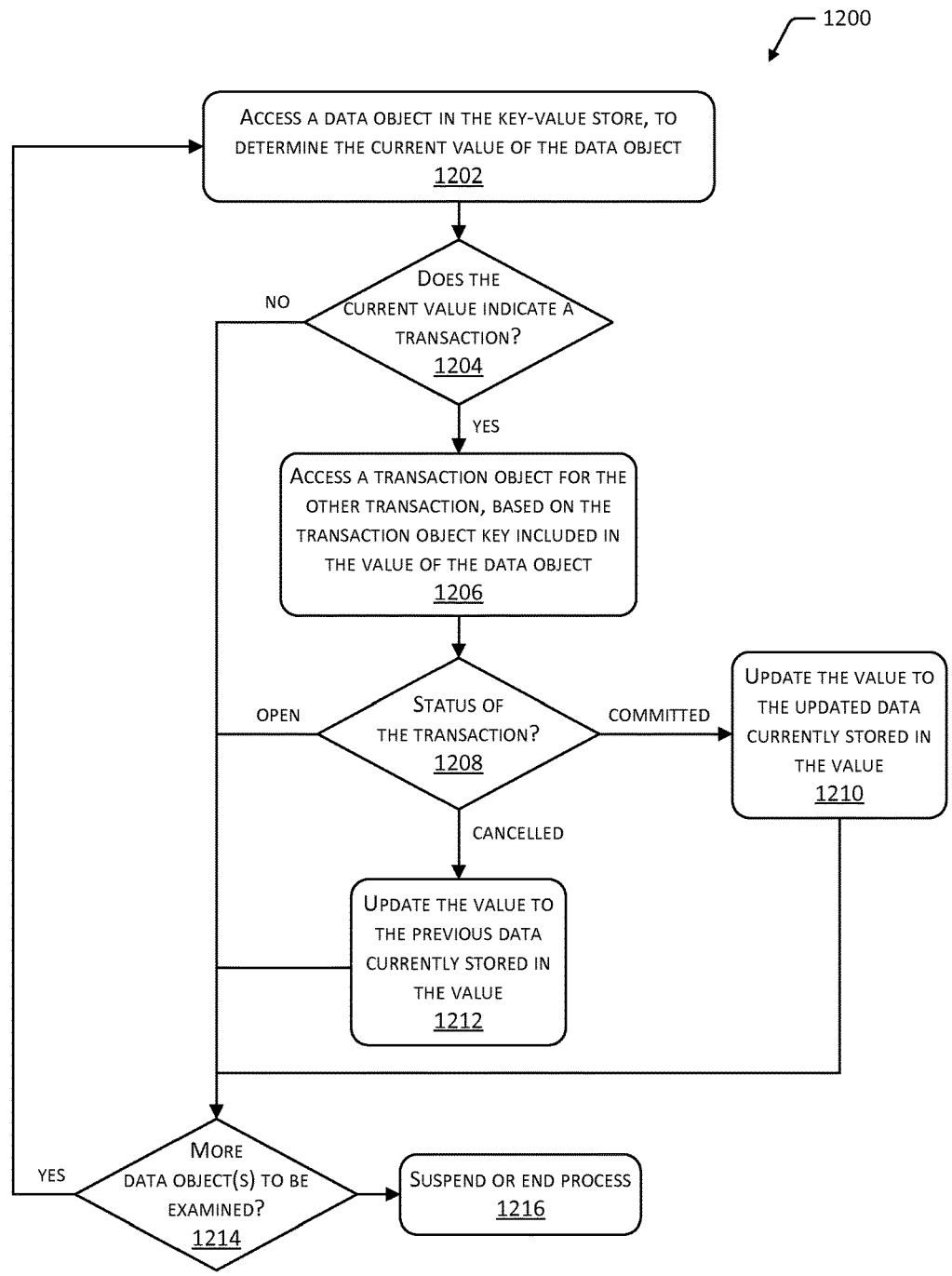
FIG. 12 depicts a flow diagram of a process for reducing the data stored in values of data objects in the key-value store, based on determining that previous transactions have a committed or cancelled status.

FIG. 12 depicts a flow diagram 1200 of a process for reducing the data stored in values 132 of the data objects 126 in the key-value store 122, based on determining that previous transactions 118 have a committed or cancelled status. Operations of the process may be performed by the transaction management module(s) 116, other modules executing on the transaction management device(s) 108, or other modules executing on other devices. In some implementations, the process of FIG. 12 may execute as scheduled periodically (e.g., nightly, weekly, etc.) or based on an instruction submitted by an operator, to clean up the data stored in the key-value store 122. The process may operate to remove transaction objects 124 for transactions 118 that are in the committed or cancelled status. The process may also operate to reduce the amount of storage space used by the data objects 126 in the key-value store 122.

At 1202, a data object 126 is accessed and examined to determine the current value 132 of the data object 126. At 1204, a determination is made whether the value 132 indicates a transaction 118, e.g., whether the value 132 includes a transaction object key 128. If not, the process may proceed to 1214. If so, the process may proceed to 1206.

At 1206, a transaction object 124 corresponding to the transaction 118 is accessed based on the transaction object key 128 included in the value 132. At 1208, the status of the transaction 118 is determined based on the transaction object value 130 of the transaction object 124. If the status is open, the process may proceed to 1214. If the process is committed, the process may proceed to 1210. If the status is cancelled, the process may proceed to 1212.

At 1210, the value 132 of the data object 126 may be overwritten such that the value 132 is the updated data 112 currently stored in the value 132 and such that the value 132 no longer includes a transaction object key 128. The process may then proceed to 1214. At 1212, the value 132 of the data object 126 may be overwritten such that the value 132 is the previous data 134 currently stored in the value 132 and such that the value 132 no longer includes a transaction object key 128. After 1212, the process may proceed to 1214.

At 1214, a determination is made whether there are one or more data objects 126 yet to be examined in the key-value store 122. If so, the process may return to 1202 and analyze another data object 126. If not, the process may suspend or end at 1216. In some cases, one or more transaction objects 124 may also be deleted as part of the process of FIG. 12, based on a determination that all of the data object(s) 126 that previously referenced the transaction object(s) 124 have been updated at 1210 or 1212 to no longer reference the transaction object(s) 124. In such cases, the deleting of the transaction object(s) 124 may also be based on a determination that the transaction object(s) 124 are not associated with open transactions, and instead have a status of cancelled or committed.

In some implementations, the process of FIG. 12 may execute periodically to reduce the storage space consumed by the data object(s) 126 and the transaction object(s) 124. In some cases, removing at least some of the transaction object(s) 124 from the key-value store 122 may provide for faster processing of transaction(s) 118. For example, the transaction management module(s) 116 may be less likely to access a transaction object 124 prior to updating a data object 126, if one or more data object(s) 126 are compacted as described above. In some cases, the process of FIG. 12 may execute as part of the process of FIGS. 8 and 9, to clean up data object(s) 126 after a transaction 118 has been committed or cancelled. For example, as shown in FIG. 5, after the transaction 118(1) is committed the values 132 of the data object(s) 126(1) and 126(2) may be updated to "3" and "4" respectively, and the transaction object 124(1) "T1" may be deleted from the key-value store 122.

Example Code 1, below, provides an example implementation of at least some of the techniques described herein. Although Example Code 1 gives an example of code written in a particular language, using particular variable names, method names, method signatures, and classes, implementations are not limited to such examples. Implementations may employ any programming language and may be written using any programming paradigms, techniques, or design patterns, and using any variable types, variable names, method names, method signatures, or classes.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

Example Code 1

```
public class TransactionManager {
  private final BlobStorage delegate;
  private final Serializer serializer;
  public TransactionManager(BlobStorage delegate, Serializer serializer) {
    this.delegate = delegate;
    this.serializer = serializer;
  }
  public String openTransaction() {
    Tx transaction = new Tx();
    byte[] data = serializer.serialize(transaction);
    BlobKey key = getTransactionKey(transaction.getTransactionId());
    PutRequest put = new PutRequest(key, data, new Condition.IfNoIdentifierExists(), new Consistency.FastQuorum());
    PutResponse resp = delegate.put(put)[0];
    resp.throwException();
    return transaction.getTransactionId();
```

```
    }
    public void commitTransaction(String transactionId) {
        finalizeTransaction(TxStatus.COMMITTED, transactionId);
    } public void rollbackTransaction(String transactionId) {
        finalizeTransaction(TxStatus.CANCELLED, transactionId);
    }
    public GetResponse[] get(String transactionId, GetRequest...
gets) {
        try {
            return getUnsafe(gets);
        } catch (BlobException e) {
            return buildResponse(gets, e);
        }
    }
    public PutResponse[] put(String transactionId, PutRequest...
puts) {
        try {
            putUnsafe(transactionId, puts);
            return buildResponse(puts);
        } catch (BlobException e) {
            return buildResponse(puts, e);
        }
    }
    public DeleteResponse[] delete(DeleteRequest... req) {
```

```
    return null;
  }
  public ListResponse list(ListRequest req) {
    return null;
  }
  public String getProtocol() {
    return "lsd";
  }
  /*
   * private routines - transactions
   */
  private void finalizeTransaction(TxStatus desiredStatus,
String transactionId) {
    Map<String, GetResponse> rawTransactions =
getTransactionObjectData(Arrays.asList(transactionId));
    Map<String, Tx> decodedTransactions =
decodeTransactions(rawTransactions);
    Tx transaction = decodedTransactions.get(transactionId);
    if (transaction.getStatus() == desiredStatus) { return; }
    if (transaction.getStatus() != TxStatus.OPEN) {
      String msg = "Transaction could not be finalized to " +
desiredStatus + " because it was previously "
          + transaction.getStatus();
      throw new BlobConditionException(msg);
    }
```

```
    finalizeOpenTransactions(desiredStatus, rawTransactions,
decodedTransactions);
  }
  private BlobKey getTransactionKey(String transactionId) {
    return new BlobKey(null, "transactions", transactionId,
null);
  }
  private Map<String, GetResponse>
getTransactionObjectData(List<String> transactionIds) {
    BlobKey[] keys = new BlobKey[transactionIds.size()];
    GetRequest[] req = new GetRequest[transactionIds.size()];
    // get the bare objects
    for (int i = 0; i < transactionIds.size(); i++) {
      keys[i] = getTransactionKey(transactionIds.get(i));
      req[i] = new GetRequest(keys[i], new
Consistency.Quorum());
    }
    GetResponse[] resp = delegate.get(req);
    // check and load the entries
    Map<String, GetResponse> transactions = new
HashMap<String, GetResponse>();
    for (int i = 0; i < resp.length; i++) {
      resp[i].throwException();
      transactions.put(transactionIds.get(i), resp[i]);
    }
    return transactions;
```

```
  }
  private Map<String, Tx> decodeTransactions(Map<String,
GetResponse> responses) {
    Map<String, Tx> transactions = new HashMap<String, Tx>();
    for (String tid : responses.keySet()) {
      GetResponse resp = responses.get(tid);
      Tx transaction = serializer.deserialize(resp.getBytes(),
Tx.class);
      transactions.put(tid, transaction);
    }
    return transactions;
  }
  private void finalizeOpenTransactions(TxStatus
desiredStatus, Map<String, GetResponse> rawTransactions,
      Map<String, Tx> decodedTransactions) {
    List<Tx> openTransactions =
findOpenTransactions(decodedTransactions);
    PutRequest[] reqs =
buildTransactionFinalizeRequests(desiredStatus,
openTransactions, rawTransactions);
    PutResponse[] resps = delegate.put(reqs);
    for (int i = 0; i < resps.length; i++) {
      resps[i].throwException();
    }
  }
```

```
    private List<Tx> findOpenTransactions(Map<String, Tx>
decodedTransactions) {

List<Tx> openTransactions = new ArrayList<Tx>();

for (Entry<String, Tx> tx :
decodedTransactions.entrySet()) { if (tx.getValue().getStatus() == TxStatus.OPEN) { openTransactions.add(tx.getValue());

}

} return openTransactions;

} private PutRequest[]
buildTransactionFinalizeRequests(TxStatus desiredStatus,
List<Tx> openTransactions, Map<String, GetResponse> rawTransactions) {

PutRequest[] puts = new
PutRequest[openTransactions.size()];

for (int i = 0; i < puts.length; i++) {

String tid = openTransactions.get(i).getTransactionId();

GetResponse = rawTransactions.get(tid);

Tx transaction = openTransactions.get(i);

transaction.setStatus(desiredStatus);

byte[] data = serializer.serialize(transaction);

puts[i] = new PutRequest(getResponse.getKey(), data, new
Condition.Matches(getResponse.getRevision()), new Consistency.FastQuorum());
```

```
    }
    return puts;
  }
  /*
   * private routines - gets
   */
  private GetResponse[] getUnsafe(GetRequest[] gets) {
    GetResponse[] getsR = delegate.get(gets);
    TxValue[] values = decodeTxValueObjects(getsR);
    List<String> transactionIds =
getTransactionIdsAssociatedWithTxValues(values);
    Map<String, GetResponse> rawTransactions =
getTransactionObjectData(transactionIds);
    Map<String, Tx> decodedTransactions =
decodeTransactions(rawTransactions);
    byte[][] currentData = selectCurrentDataForValue(values,
decodedTransactions);

return buildReplacementGetResult(gets, currentData);
  }
  private GetResponse[] buildReplacementGetResult(GetRequest[]
gets, byte[][] currentData) {
    GetResponse[] result = new GetResponse[gets.length];
    for (int i = 0; i < currentData.length; i++) {
      result[i] = new GetResponse();
      result[i].setBytes(currentData[i]);
```

```
    result[i].setKey(gets[i].getKey());

result[i].setRevision(Hash.sha256(currentData[i]));

} return result;

} private GetResponse[] buildResponse(GetRequest[] req,
BlobException e) {

GetResponse[] resp = new GetResponse[req.length];

for (int i = 0; i < req.length; i++) { resp[i] = new GetResponse();

resp[i].setException(e);

} return resp;

}

/*
 * private routines - puts
 */ private void putUnsafe(String transactionId, PutRequest...
puts) {

GetRequest[] gets = buildGetRequestsFromPutRequests(puts);

GetResponse[] getsR = delegate.get(gets);

TxValue[] values = decodeTxValueObjects(getsR);

List<String> transactionIds =
getTransactionIdsAssociatedWithTxValues(values);

Map<String, GetResponse> rawTransactions =
getTransactionObjectData(transactionIds);
```

```
    Map<String, Tx> decodedTransactions =
decodeTransactions(rawTransactions);

byte[][] currentData = selectCurrentDataForValue(values,
decodedTransactions);

// check first, throws exception and doesn't harm others
    checkForConditionalFailure(puts, currentData);

// ok, kill them all
    finalizeOpenTransactions(TxStatus.CANCELLED,
rawTransactions, decodedTransactions);

// create replacement requests and execute
    PutRequest[] newPuts = buildReplacementPuts(transactionId,
puts, getsR, currentData);

PutResponse[] newResp = delegate.put(newPuts);

// check the responses
    for (int i = 0; i < newResp.length; i++) {
      newResp[i].throwException();
    }
  } private GetRequest[]
buildGetRequestsFromPutRequests(PutRequest[] puts) {
    GetRequest[] gets = new GetRequest[puts.length];
    for (int i = 0; i < puts.length; i++) {
      gets[i] = new GetRequest(puts[i].getKey(), new
Consistency.Quorum());
    }
    return gets;
```

```
    }
    private void checkForConditionalFailure(PutRequest[] put,
byte[][] currentData) {
        // check for conditional failure
        for (int i = 0; i < put.length; i++) {
            Condition = put[i].getCondition();
            BlobKey key = put[i].getKey();
            checkCondition(key, condition, currentData[i]);
        }
    }
    private PutRequest[] buildReplacementPuts(String
transactionId, PutRequest[] puts, GetResponse[] getsR,
        byte[][] oldValues) {
        // create all values
        // create put requests
        PutRequest[] newPuts = new PutRequest[puts.length];
        for (int i = 0; i < puts.length; i++) {
            TxValue value = new TxValue();
            value.setCommittedData(oldValues[i]);
            value.setOpenTransactionData(puts[i].getBytes());
            value.setOpenTransactionId(transactionId);
            BlobKey key = puts[i].getKey();
            byte[] data = serializer.serialize(value);
            Condition;
            if (getsR[i].getRevision() == null) {
                condition = new Condition.IfNoSubIdentifierExists();
```

```
      } else {
        condition = new
Condition.Matches(getsR[i].getRevision());
      }
      newPuts[i] = new PutRequest(key, data, condition, new
Consistency.FastQuorum());
    }
    return newPuts;
  }
  private PutResponse[] buildResponse(PutRequest[] req) {
    return buildResponse(req, null);
  }
  private PutResponse[] buildResponse(PutRequest[] req,
BlobException e) {
    PutResponse[] resp = new PutResponse[req.length];
    for (int i = 0; i < req.length; i++) {
      resp[i] = new PutResponse();
      resp[i].setException(e);
    }
    return resp;
  }
  /*
   * private routines - shared
   */
  private TxValue[] decodeTxValueObjects(GetResponse[] getR) {
    TxValue[] values = new TxValue[getR.length];
```

```
    for (int i = 0; i < getR.length; i++) {
      if (getR[i].getException() != null) {
        if (getR[i].getException() instanceof
NotFoundBlobException) {
          values[i] = null;
        } else {
          getR[i].throwException();
        }
      } else {
        values[i] = serializer.deserialize(getR[i].getBytes(),
TxValue.class);
      }
    }
    return values;
  }
  private List<String>
getTransactionIdsAssociatedWithTxValues(TxValue[] values) {
    List<String> transactionIds = new ArrayList<String>();
    for (int i = 0; i < values.length; i++) {
      if (values[i] != null &&
values[i].getOpenTransactionId() != null) {
        transactionIds.add(values[i].getOpenTransactionId());
      }
    }
    return transactionIds;
  }
```

```
  private byte[][] selectCurrentDataForValue(TxValue[] values,
Map<String, Tx> decodedTransactions) {
    byte[][] currentData = new byte[values.length][];
    for (int i = 0; i < values.length; i++) {
      TxValue value = values[i];
      currentData[i] = determineValue(value,
decodedTransactions);
    }
    return currentData;
  }
  private byte[] determineValue(TxValue value, Map<String, Tx>
transactions) {
    if (value == null) { return null; }
    if (value.getOpenTransactionId() == null) { return
value.getCommittedData(); }
    Tx = transactions.get(value.getOpenTransactionId());
    if (tx.getStatus() == TxStatus.COMMITTED) { return
value.getOpenTransactionData(); }
    return value.getCommittedData();
  }
  private void checkCondition(BlobKey key, Condition, byte[]
data) {
    if (condition == null) {
      String msg = "The key " + key + " does not specify a put
condition, which is required for LSD";
      throw new BlobConditionException(msg);
```

```
    } if (condition instanceof Condition.IfNoIdentifierExists ||
condition instanceof Condition.IfNoIdentifierExists) {
        if (data != null) {
            String msg = "The key " + key + " does not exist, but
the condition was set to "
                + condition.getClass().getSimpleName();
            throw new BlobConditionException(msg);
        }
    } else if (condition instanceof Condition.Matches) {
        Condition.Matches matchCondition = (Condition.Matches)
condition;
        String expectedRvn = matchCondition.getRevision();
        String actualRvn = Hash.sha256(data);
        if (!actualRvn.equals(expectedRvn)) {
            String msg = "The key " + key + " specified a match
condition with rvn '" + expectedRvn
                + "' but the actual rvn was '" + actualRvn + "'";
            throw new BlobConditionException(msg);
        }
    } else {
        String msg = "The key " + key + " specified a condition
type that is unsupported in LSD "
            + condition.getClass().getSimpleName();
        throw new BlobConditionException(msg);
```

```
        }
    }
}
```

What is claimed is:

1. A system, comprising:
at least one computing device that implements one or more services, wherein the one or more services:
provide a key-value store that comprises:
a plurality of transaction objects, individual ones of the plurality of transaction objects associated with a transaction to update one or more of a plurality of data objects stored in the key-value store, the individual ones of the plurality of transaction objects identified by a transaction object key, the individual ones of the plurality of transaction objects comprising a transaction object value that indicates a status of the transaction; and
the plurality of data objects, individual ones of the plurality of data objects identified by a key, and the individual ones of the plurality of data objects comprising a value that includes:
first data stored in the value during a first transaction;
second data stored in the value during a second transaction that executes at least partly after the first transaction; and
the transaction object key that identifies the second transaction;
receive a transaction request to execute a transaction to update the individual ones of the plurality of data objects in the key-value store;
determine the transaction object key corresponding to the transaction;
access an individual data object of the plurality of data objects identified by the key in the key-value store, the value of the data object comprising the first data currently stored in the value;
update the value of the data object to include the first data, the second data, and the transaction object key;
access a second transaction request to execute a second transaction to update the data object in the key-value store, the second transaction request including:
the key that identifies the data object to be updated; and
third data to be stored in the value of the data object;
determine a second transaction object key corresponding to the second transaction;
access the data object identified by the key in the key-value store;
determine whether the key-value store includes a first transaction object associated with a first transaction object key included in the value of the data object; and
on a determination that the key-value store includes the first transaction object and that the first transaction object value indicates a committed status of the first transaction, update the value of the data object to include:
the second data;
the third data included in the second transaction request; and
a second transaction object key.

2. The system of claim 1, wherein:
the at least one computing device includes multiple computing devices;
the key-value store is distributed across file systems of the multiple computing devices;
the plurality of data objects are a first plurality of files stored in the file systems, individual ones of the first plurality of files identified by a first file name that is the key that identifies the data object; and
the plurality of transaction objects are a second plurality of files stored in the file systems, individual ones of the second plurality of files identified by a second file name that is the transaction object key that identifies a transaction object.

3. The system of claim 1, wherein the status of the transaction includes one of:
the committed status indicates that the transaction has completed updating one or more data objects;
a cancelled status indicates that the transaction failed to update the one or more data objects; or
an open status indicates that the transaction is in progress updating the one or more data objects.

4. The system of claim 3, wherein the one or more services further:
access a read request for the value of a data object in the key-value store, the read request specifying the key of the data object;
determine whether the transaction object key included in the value of the data object references a transaction object that is included in the key-value store;
provide the first data or the second data in response to the read request on determining that the transaction object is not included in the key-value store indicating the open status of the transaction;
provide the first data or the second data in response to the read request, on determining that the transaction object value of the transaction object indicates the cancelled status of the transaction; and
provide the second data or the third data in response to the read request, on determining that the transaction object value of the transaction object indicates the committed status of the transaction.

5. A computer-implemented method, comprising:
accessing a transaction request to execute a transaction to update a data object in a key-value store, the transaction request including:
a key that identifies the data object to be updated; and
second data to be stored in a value of the data object;
determining a transaction object key corresponding to the transaction;
accessing the data object identified by the key in the key-value store, the value of the data object comprising first data currently stored in the value;
updating the value of the data object to include the first data, the second data, and the transaction object key;
committing the transaction on determining that the updating of the value succeeded, the committing of the transaction including commitment to the update of the value of the data object to include the first data, the second data, and the transaction object key, creating in the key-value store a transaction object for the transaction, the transaction object identified by the transaction object key, the transaction object comprising a transaction object value that indicates a committed status of the transaction;
cancelling the transaction on determining that the updating of the value failed, the cancelling of the transaction including creating in the key-value store the transaction object for the transaction, the transaction object comprising the transaction object value that indicates a cancelled status of the transaction;
accessing a second transaction request to execute a second transaction to update the data object in the key-value store, the second transaction request including:

the key that identifies the data object to be updated; and
third data to be stored in the value of the data object;
determining a second transaction object key corresponding to the second transaction;
accessing the data object identified by the key in the key-value store;
determining whether the key-value store includes a first transaction object associated with a first transaction object key included in the value of the data object; and
on determining that the key-value store includes the first transaction object and that the first transaction object value indicates the committed status of the first transaction, updating the value of the data object to include:
the second data;
the third data included in the second transaction request; and
a second transaction object key.

6. The method of claim 5, further comprising:
accessing a read request for the value of the data object, the read request specifying the key of the data object;
accessing the data object identified by the key in the key-value store;
determining whether the key-value store includes the transaction object corresponding to the transaction object key included in the value of the data object;
on determining that the key-value store does not include the transaction object, indicating an open status of the transaction, providing the first data or the second data in response to the read request;
on determining that the key-value store includes the transaction object and that the transaction object value of the transaction object indicates the cancelled status of the transaction, providing the first data or the second data in response to the read request; and
on determining that the key-value store includes the transaction object and that the transaction object value of the transaction object indicates the committed status of the transaction, providing the second data or the third data in response to the read request.

7. The method of claim 5, wherein:
the transaction request is a first transaction request;
the transaction is a first transaction;
the transaction object is a first transaction object;
the transaction object key is a first transaction object key; and
the transaction object value is a first transaction object value.

8. The method of claim 7, further comprising:
on determining that the key-value store does not include the first transaction object, indicating an open status of the first transaction, updating the value of the data object to include:
the first data;
the third data included in the second transaction request; and
the second transaction object key; and
cancelling the first transaction, including creating in the key-value store the first transaction object for the first transaction, the first transaction object comprising the first transaction object value that indicates the cancelled status of the first transaction.

9. The method of claim 7, further comprising:
on determining that the key-value store includes the first transaction object and that the first transaction object value indicates the cancelled status of the first transaction, updating the value of the data object to include:
the first data;
the third data included in the second transaction request; and
the second transaction object key.

10. The method of claim 5, wherein:
the data object further comprises a revision key indicating a version of data stored in the data object;
the transaction request further includes the revision key that references previously stored data that was previously stored in the value of the data object; and
the updating of the value of the data object fails on determining that the revision key associated with the value in the key-value store does not correspond to the revision key included in the transaction request.

11. The method of claim 5, wherein:
the key-value store is distributed across file systems of multiple computing devices;
the data object is a first file stored in the file systems;
the key that identifies the data object is a first file name of the first file;
the transaction object is a second file stored in the file systems; and
the transaction object key that identifies the transaction object is a second file name of the second file.

12. The method of claim 5, wherein:
the transaction request is a first transaction request; and
the method is executed to process the first transaction request on a first transaction management device operating independently of a second transaction management device processing a second transaction request.

13. One or more non-transitory computer-readable storage media storing instructions which, when executed by at least one processor, instruct the at least one processor to perform actions comprising:
accessing a transaction request to execute a transaction to update a data object in a key-value store that comprises a plurality of data objects, individual ones of the plurality of data objects identified by a key, and the individual ones of the plurality of data objects comprising a value, the transaction request including:
the key that identifies the data object to be updated; and
second data to be stored in the value of the data object;
determining a transaction object key that identifies the transaction;
accessing the data object identified by the key in the key-value store, the value of the data object comprising first data currently stored in the value;
updating the value of the data object to include the first data, the second data, and the transaction object key;
accessing a second transaction request to execute a second transaction to update the data object in the key-value store, the second transaction request including:
the key that identifies the data object to be updated; and
third data to be stored in the value of the data object;
determining a second transaction object key corresponding to the second transaction;
accessing the data object identified by the key in the key-value store;
determining whether the key-value store includes a first transaction object corresponding to a first transaction object key included in the value of the data object; and
on determining that the key-value store includes the first transaction object and that a first transaction object value of the first transaction object indicates a committed status of the first transaction, updating the value of the data object to include:

the second data;
the third data included in the second transaction request; and
a second transaction object key.

14. The one or more non-transitory computer-readable storage media of claim 13, wherein the actions further comprise:
committing the transaction on determining that the updating of the value succeeded, the committing of the transaction including creating a transaction object in the key-value store, the transaction object identified by the transaction object key, the transaction object comprising a transaction object value that indicates a committed status of the transaction; and
cancelling the transaction on determining that the updating of the value failed, the cancelling of the transaction including creating the transaction object in the key-value store, the transaction object identified by the transaction object key, the transaction object comprising the transaction object value that indicates a cancelled status of the transaction.

15. The one or more non-transitory computer-readable storage media of claim 13, wherein the actions further comprise:
creating a transaction object in the key-value store, the transaction object identified by the transaction object key, the transaction object comprising a transaction object value that indicates an open status of the transaction.

16. The one or more non-transitory computer-readable storage media of claim 13, wherein the actions further comprise:
accessing a read request for values of a set of data objects that include at least two of the plurality of data objects, the read request specifying keys corresponding to the set of data objects;
performing a first pass over the set of data objects, including:
accessing the set of data objects identified by the keys in the key-value store;
storing values of the set of data objects; and
storing, in a data structure, one or more transaction object keys included in the values of the set of data objects, the one or more transaction object keys corresponding to one or more transactions that are in a committed status;
performing a second pass over the set of data objects, including:
accessing the set of data objects; and
for individual ones of the set of data objects, determining whether the value of the data object includes one of the one or more transaction object keys stored in the data structure during the first pass; and
determining a set of results to be provided in response to the read request, the set of results being consistent with respect to the one or more transactions, the set of results including, for one or more of the set of data objects for which the values include the one or more transaction object keys:

instances of the first data stored in the values of the set of data objects prior to the one or more transactions;
instances of the second data stored in the values of the set of data objects by the one or more transactions; or
instances of the third data stored in the values of the set of data objects by the one or more transactions.

17. The one or more non-transitory computer-readable storage media of claim 13, wherein the actions further comprise:
accessing a read request for the value of the data object, the read request specifying the key of the data object;
accessing the data object identified by the key in the key-value store;
determining whether the key-value store includes a transaction object corresponding to the transaction object key included in the value of the data object;
on determining that the key-value store does not include the transaction object, indicating an open status of the transaction, providing the first data or the second data in response to the read request;
on determining that the key-value store includes the transaction object and that a transaction object value of the transaction object indicates a cancelled status of the transaction, providing the first data or the second data in response to the read request; and
on determining that the key-value store includes the transaction object and that the transaction object value of the transaction object indicates a committed status of the transaction, providing the second data or the third data in response to the read request.

18. The one or more non-transitory computer-readable storage media of claim 13, wherein:
the transaction request is a first transaction request;
the transaction is a first transaction; and
the transaction object key is a first transaction object key.

19. The one or more non-transitory computer-readable storage media of claim 18, the actions further comprising:
on determining an open status of the first transaction, updating the value of the data object to include:
the first data;
the third data included in the second transaction request; and
the second transaction object key; and
cancelling the first transaction, including writing the first transaction object value to indicate a cancelled status of the first transaction.

20. The one or more non-transitory computer-readable storage media of claim 19, wherein the determining of the open status of the first transaction includes:
determining that the key-value store does not include the first transaction object; or
determining that the key-value store includes the first transaction object and that the first transaction object value indicates the open status of the first transaction.

* * * * *